US012353427B2

(12) United States Patent
Yim

(10) Patent No.: US 12,353,427 B2
(45) Date of Patent: Jul. 8, 2025

(54) RENDERING SUGGESTION FOR SEARCHING ENTITY WITHIN APPLICATION IN RESPONSE TO DETERMINING THE ENTITY IS ASSOCIATED WITH THE APPLICATION

(71) Applicant: GOOGLE LLC, Mountain View, CA (US)

(72) Inventor: Keun Soo Yim, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/390,874

(22) Filed: Dec. 20, 2023

(65) Prior Publication Data

US 2024/0411770 A1 Dec. 12, 2024

Related U.S. Application Data

(63) Continuation-in-part of application No. 18/206,465, filed on Jun. 6, 2023.

(51) Int. Cl.
*G06F 16/248* (2019.01)
*G06F 16/2457* (2019.01)

(52) U.S. Cl.
CPC ...... *G06F 16/248* (2019.01); *G06F 16/24578* (2019.01)

(58) Field of Classification Search
None
See application file for complete search history.

(56) References Cited

U.S. PATENT DOCUMENTS

| 11,704,136 | B1* | 7/2023 | Sharifi | G06F 16/156 |
| | | | | 382/305 |
| 12,124,881 | B2* | 10/2024 | Talavera | G06Q 10/02 |
| 12,182,149 | B1* | 12/2024 | Krishna | G06F 16/248 |
| 2017/0032257 | A1 | 2/2017 | Sharifi et al. | |
| 2017/0098012 | A1* | 4/2017 | Zhu | G06F 16/24578 |
| 2017/0311053 | A1* | 10/2017 | Ganjam | G06V 20/20 |
| 2018/0113753 | A1 | 4/2018 | Franklin | |
| 2020/0034357 | A1 | 1/2020 | Panuganty et al. | |

(Continued)

FOREIGN PATENT DOCUMENTS

KR 20160103875 9/2016

OTHER PUBLICATIONS

Entity Recommendation for Everyday Digital Tasks (Year: 2021).*

(Continued)

*Primary Examiner* — Kim T Nguyen
(74) *Attorney, Agent, or Firm* — Gray Ice Higdon

(57) ABSTRACT

Implementations include recognizing entities in a user query received from a client device and determining whether any of the recognized entities is a personal entity using an entity database storing personal entities donated by applications installed at the client device. Application(s) or application action(s) can be determined based on entity information of the recognized entities, and suggestions can be generated to suggest the determined application(s) (or the determined application action(s)). For an application (or application action) determined based on a recognized entity that is determined as a personal entity, a suggestion for the application (or application action) can be boosted for display to a user of the client device.

11 Claims, 18 Drawing Sheets

(56) References Cited

U.S. PATENT DOCUMENTS

| | | | | |
|---|---|---|---|---|
| 2021/0328949 A1* | 10/2021 | Yim | ............ | G06F 9/453 |
| 2022/0147775 A1* | 5/2022 | Yim | ............ | H04L 51/046 |
| 2023/0005019 A1* | 1/2023 | Huang | ............ | G06Q 30/0256 |
| 2023/0359241 A1* | 11/2023 | Faaborg | ............ | G06V 40/168 |
| 2024/0167834 A1* | 5/2024 | Sharifi | ............ | H04L 51/216 |
| 2024/0220324 A1* | 7/2024 | Talavera | ............ | G06Q 10/10 |
| 2024/0411770 A1* | 12/2024 | Yim | ............ | G06F 16/90332 |
| 2024/0411813 A1* | 12/2024 | Yim | ............ | G06F 40/30 |

OTHER PUBLICATIONS

European Patent Office; International Search Report and Written Opinion issued in Application No. PCT/US2023/036885; 12 pages; dated Feb. 7, 2024.

Aliannejadi et al., "Target Apps Selection: Towards a Unified Search Framework for Mobile Devices" arXiv:1805.02211v3 [cs.IR] 10 pages, dated Jul. 13, 2018.

\* cited by examiner

RENDERING SUGGESTION FOR SEARCHING ENTITY WITHIN APPLICATION IN RESPONSE TO DETERMINING THE ENTITY IS ASSOCIATED WITH THE APPLICATION

BACKGROUND

Users, when using a client device such as a smartphone, are often presented with a plurality of applications installed at, or otherwise accessible, via the client device. From the plurality of presented applications, users can choose to explicitly trigger an application (e.g., a music app or a digital wallet), to fulfill an application action (e.g., play music, make a payment) with respect to a desired entity (e.g., a song within the music app, a credit card in a digital wallet, etc.) that is accessible via the application.

This often means that, if a user wants to access the desired entity, the user has to accurately identify the application that enables access to the desired entity, for the particular application to be explicitly triggered to provide the user with access to the desired entity. For example, the user will need to identify and launch the application, then provide input(s) within the launched application to navigate to or search for the entity. In the case where the user is using an automated assistant or an on-device search engine (or other query recommendation system), the user will have to accurately identify the particular application in a spoken query for accessing the desired entity to an automated assistant, or in a typed query for accessing the desired entity via an on-device search engine.

If the user provides an incomplete or inadequate query that identifies the desired entity but no application that enables access to the desired entity, such as a spoken or typed query of "Assistant, credit card X please" to an automated assistant, the automated assistant (or on-device search engine) may not be responsive to such spoken query or typed query. As a result, no application is triggered to fulfill an application action (e.g., search within the app, display, etc.) with respect to the desired entity (e.g., "credit card X"). This will result in repeated attempts by the user in providing an appropriate query that can trigger an application which provides access to the desired entity. Such repeated attempts can lead to extensive consumption of computing and/or battery resources of the client device.

SUMMARY

Implementations disclosed herein relate to enabling an on-device system (e.g., a search engine, an automated assistant, an operating system, or other system) of a client device to identify an application to utilize in automatically completing a user query that specifies an entity but fails to specify any application for accessing the entity. For example, implementations can determine, based on historical queries, that a particular entity is associated with a particular application. Further, in response to such a determination, implementations can, in response to a query that specifies the particular entity but fails to specify any application, cause a suggestion to be rendered that, when selected, executes fulfillment information that causes a search of the entity to be performed within the application. For instance, it can be determined, based on processing of historical queries, that Entity A is associated with Application X and, in response to a partial query that specifies an alias of Entity A, but that fails to specify any application, a suggestion can be rendered that, when selected, causes Application X to be launched and transitioned to a state in which Entity A is searched for or otherwise surfaced within Application X. The suggestion can, for example, include text that specifies Application X, an icon that specifies Application X, and/or other indicia of Application X. In these and other manners, a single selection of the suggestion can cause Entity A to be searched for within Application X-obviating the need for multiple inputs to search for Entity A within Application X. Further, through utilization of historical queries in determining that Entity A is associated with Application X, it can be ensured that Entity A is accessible within Application X and an association of Entity A with application X can be determined without requiring a developer of Application X to specify such an association.

An entity described herein can be a public entity or a personal/private entity. A client device described herein can include a plurality of installed applications. In various implementations, the on-device system described herein can train a probabilistic model and use the trained probabilistic model to generate a plurality of probabilities each indicating a likelihood of the entity being present in, or otherwise accessible via, a respective application out of the plurality of applications. Based on the plurality of probabilities, one or more suggestions can be generated and rendered to the user, responsive to a user query that specifies the entity. The one or more suggestions can be selectable and can each include (e.g., be embedded with) fulfillment information for triggering a corresponding application (out of the plurality of applications) to perform an application action (e.g., search, display, etc.) with respect to the entity. In this way, in cases where the user cannot remember a specific application to access the entity (or forget to include the specific application in a query towards the query recommendation system, etc.), the query recommendation system can still process the entity and provide responsive suggestion(s) for triggering an application that provides access to the entity. As a result, the user may not need to make repeated attempts in providing a complete query that includes an accurate application name, which results in reduced consumption of computing and battery resources of the client device.

Various implementations herein relate to determining that an entity (e.g., credit card X) is associated with an application (e.g., digital wallet Y). Determining that the entity is associated with the application can be based on identifying occurrences of one or more historical queries (e.g., thousands of, tens of thousands of historical queries) that are submitted via one or more computing devices. Each of the one or more historical queries can include an entity name for a respective entity and an application name for a respective application providing access to the respective entity. As a non-limiting example, the one or more historical queries can include a first historical query of "search Credit Card X on digital wallet Y", where the first historical query is generated based on a first user submitting, via a search field of an application (i.e., the digital wallet Y) accessed by the first user using a first client device, an entity name of "Credit Card X". As another non-limiting example, the one or more historical queries can include a second historical query of "play song A on music app B", where the second historical query is audibly received by an automated assistant from a second user (the same as or different from the first user). In this latter example, "song A" is an entity that the second user desires to access via a corresponding application of "music app B". The second historical query can be received via a second client device that is the same as, or different from the first client device.

In various implementations, the entity name for the respective entity can be a name (official, unofficial, etc.) of the respective entity, or an identifier of the respective entity. In various implementations, the application name for the respective entity can be an application nickname (e.g., E-Wallet for "digital wallet"), an application name synonym (e.g., DW for "digital wallet"), or an application type name (e.g., wallet for "digital wallet"). It's noted that the entity name or application name is not limited to descriptions herein.

In various implementations, the one or more historical queries can be collected and stored in a historical query collection file, which can be split into, or be processed to form, a plurality of query files (may also be referred to as "query logs") For example, the historical query collection file can include a massive amount of historical queries collected from different users and from different client devices. In this example, the historical query collection file can be divided (e.g., randomly) into a plurality of query files each having one or more of the historical queries. In some implementations, a plurality of historical queries can be collected and split to generate the plurality of query files directly (i.e., without forming the historical query collection file). The plurality of query files can be processed in parallel each using a mapper processing module (maybe simply referred to as a "mapper" that executes a mapping function mapping queries to entities), to generate a plurality of intermediate outputs. Each of the plurality of intermediate outputs can be in a form of key-value pairs (e.g., application-entity pairs, where each application can be a key, and entities can be values to be respectively associated with different keys). The key-value pairs, for instance, can be in a form of "<entity name> <application name>", "<application name> <entity name>", or any other applicable key-pair format).

As a non-limiting example, a first mapper can process a first query file that includes a first historical query of "search X1-on-Y1" (collected from a first user via a first client device, where X1 is an entity name of a first entity and Y1 is an application name of a first application), a second historical query of "search X2-on-Y1" (collected from a second user via a second client device, where X2 is an entity name of a second entity), and a third historical query of "search X1-on-Y2" (collected from a third user via a third client device, where Y2 is an application name of a second application different from the first application). In this example, the first mapper can generate an output (may be referred to as "first intermediate output") indicating three key-value pairs, e.g., <Entity X1><Application Y1>; <Entity X2><Application Y1>; <Entity X1><Application Y2>.

The plurality of intermediate outputs (e.g., the aforementioned three key-value pairs combined with key-value pairs respectively determined by mappers that are in addition to the first mapper) can be shuffled to combine values associated with the same key (e.g., combine "entities" for the same "application", or combine "applications" for the same "entity"), for processing by one or more reducer processing modules ("reducer"). For example, the one or more reducers can receive different subsets of key-value pairs where each subset is associated with the same key, to generate a final output, from which one or more public entities and/or one or more personal entities for each application are determined. Here, a "public entity" means an entity present in over a threshold number of historical queries mentioning a same application that are issued by over a threshold number of users.

For example, given a total number of M historical queries (1) mentioning the same particular application and (2) issued by P different users, a particular entity presenting in N historical queries out of the M historical queries can be determined as a public entity for the particular application. Alternatively or additionally, the particular entity will need to be present in N historical queries issued by Q different users out of the P users to qualify as a "public entity". In this example, M, N, P, and Q can be positive integers, where M is greater than or equal to N, and P is greater than or equal to Q. A "personal entity" means entities shown in queries specific to a user.

The public entities and/or personal entities for each application can be collected and/or stored in a corresponding entity file, along with associated metadata (e.g., fulfillment information, natural language understanding intent, all available identifiers of the public and/or personal entities including those defined/created by a user, and/or associated historical queries) to generate one or more entity files. For example, the one or more entity files can include a first entity file listing public and/or personal entities determined for a first application, a second entity file listing public and/or personal entities determined for a second application, . . . , an $n^{th}$ entity file listing public and/or personal entities determined for an $n^{th}$ application. The first entity file, for instance, can include the aforementioned metadata (e.g., fulfillment information) associated with each of the public and/or personal entities stored in the first entity log. Similar descriptions for the second entity file and other entity files are omitted herein. In some implementations, the entity file may not include entities that are neither public entities nor personal entities.

As a non-limiting example, the first entity file can be for the first application. The first entity file can include at least a first entry. The first entry of the first entity log, for example, can include a specific public entity and/or a total number of times (frequency) the specific public entity occurred concurrently with the first application in the aforementioned one or more historical queries. Optionally, the first entry can further include user IDs of different users that issued historical queries that each include both the specific public entity and the first application.

Optionally, the first entry of the first entity file can further include metadata associated with the specific public entity, such as fulfillment information (e.g., a deeplink) for performing one or more actions (e.g., a search of the specific public entity within the first application) associated with the specific public entity within the first application. Alternatively or additionally, the metadata associated with the specific public entity can include rendering information for rendering one or more suggestions each suggesting an action to be performed with respect to the specific public entity within the first application. Alternatively or additionally, the metadata associated with the specific public entity can include one or more natural language understanding (NLU) intents each capable of causing an automated assistant to perform an action associated with the specific public entity within the first application.

As a non-limiting example, the specific public entity can be song A and the first application can be a music app. In this example, the first entry of an entity file for the music app can be in a form of: <song A> <user 1, user 2, user 5, user 7> <20> <play>, where "song A" is the specific public entity accessible via the music app, "user 1, user 2, user 5, user 7" are the users from whom the historical queries mentioning both the music app and the specific public entity "song A" are collected, "play" is a NLU intent, and "20" is the number of times "song A" is associated with the music app in all the one or more historical queries. It's noted that in some circumstances, the first entry of the entity file for the music app can include more than one NLU intent associated with the public entity "song A", or can include other types of metadata (e.g., deeplinks).

As another non-limiting example, a second entity file can be for a second application, such as the aforementioned digital wallet Y. The second entity file can include a first entry corresponding to a personal entity, and/or metadata associated with the personal entity. For instance, the personal entity can be "credit X" specific to a user, and the metadata can be fulfillment data for launching the digital wallet Y in a state where credit X specific to the user is ready (e.g., displayed) for use.

In various implementations, a user device (sometimes referred to as "client device", "client computing device", or "computing device") can include one or more applications. In these implementations, entity files for the one or more applications can be retrieved and stored locally at the user device. For example, the user device can include a first app, a second app, and a third app. In this example, a first entity file for the first app, a second entity file for the second app, and a third entity file for the third app can be retrieved and stored locally at the user device, where the first, second, and third entity files can be generated based on the final output of the one or more reducers described above. For instance, the first entity file for the first app, the second entity file for the second app, and the third entity file for the third app can be stored locally within an on-device repository of the user device.

In some implementations, the first entity file for the first app can include a first set of entities (public and/or personal) and associations between each of the first set of entities and fulfillment information for fulfilling one or more actions with respect to a corresponding entity of the first set of entities within the first app. The second entity file for the second app can include a second set of entities (public and/or personal) and associations between each of the second set of entities and fulfillment information for fulfilling one or more actions with respect to a corresponding entity of the second set of entities within the second app. The third entity file for the third app can include a third set of entities (public and/or personal) and associations between each of the third set of entities and fulfillment information for fulfilling one or more actions with respect to a corresponding entity of the third set of entities within the third app.

In some implementations, the first, second, and third entity files can be stored locally at the user device in response to determining that the first app, the second app, and the third app are installed at the user device. In some implementations, the first, second, and third entity files can be utilized (e.g., via an on-device search engine) to train a probability model in processing a given entity to predict a first probability that the given entity is associated with (e.g., accessible via) the first app, a second probability that the given entity is associated with the second app, and a third probability that the given entity is associated with the third app.

In some implementations, an association between an entity and fulfillment information for fulfilling one or more actions (e.g., a search) of the entity can be stored locally (e.g., in a form of entity log) at the user device, in response to determining that the entity is associated with an application installed at the user device. In some implementations, a plurality of associations can be stored locally at the user device, each associating a respective entity and corresponding fulfillment information for fulfilling one or more actions with respect to the respective entity within a corresponding application installed at the user device.

In some implementations, subsequent to the association between the entity and the fulfillment information for fulfilling the search (and/or another action) of the entity within the application being stored locally at the user device, a user query (i.e., an incomplete query) that indicates the entity but not the application may be received via the user device. In response to receiving the user query (e.g., "Assistant, open my credit card X") that indicates the entity but not the application, various implementations can access the stored association between the entity and the fulfillment information for fulfilling the search (or another action) of the entity within the application, in response to receiving the incomplete user query. Based on the stored association between the entity and the fulfillment information for fulfilling the search (or another action) of the entity within the application (e.g., "digital wallet"), various implementations can cause a suggestion (or one or more suggestions) to be rendered via the user device in a selectable format.

The suggestion, which is rendered via the user device in the selectable format, when selected, can cause the fulfillment information to be executed, so that the search (or another action defined by the fulfillment information) of the entity within the application is fulfilled. For example, the suggestion can be rendered in a form of a selectable graphical element that identifies the entity (e.g., "credit card X"), where the selectable graphical element can be embedded with a link (e.g., URL) that leads to the launch of the application (e.g., digital wallet Y) to show the entity (e.g., credit card X). Optionally, the selectable graphical element can include a card thumbnail of credit card X, or the selectable graphical element can be displayed along with the card thumbnail of credit card X within the same user interface.

In some implementations, determining that the entity is associated with the application comprises: processing, using a trained probabilistic model, an entity name of the entity to generate an output that indicates a plurality of probabilities each representing a likelihood that the entity is present in one of a plurality of applications installed at the user device. The trained probabilistic model can be trained based on the occurrence of one or more historical queries that are submitted via the one or more corresponding computing devices and that each include a corresponding entity name for the entity and a corresponding application name of the application. As a non-limiting example, in case where the plurality of applications installed at the computing device include a first application, a second application, and a third application, the output (i.e., generated by the trained probabilistic model in processing the entity name as input) can be a probability distribution, from which three probabilities are derived. The three probabilities can include a first probability representing a likelihood that the entity is present in the first application, a second probability representing a likelihood that the entity is present in the second application, and a third probability representing a likelihood that the entity is present in the third application.

By determining that an entity (e.g., credit card X) is associated with an application (e.g., digital wallet Y) and by identifying and storing an association between the entity and fulfillment information for fulfilling a search (or other action(s)) of the entity within the application, the on-device search engine (or other query recommendation system) can be responsive to an incomplete user query (i.e., query identifying the entity without identifying the application that provides access to the entity). For example, the on-device search engine of the user device can match the entity identified from the incomplete user query to public and/or personal entities in entity files stored within the on-device repository, to determine the application that provides access to the entity and to generate and render a suggestion suggesting to launch the application.

As another example, the on-device search engine of the user device can automatically complete a user query that partially identifies an entity and identifies no application, to identify the entity, based on matching the partially identified entity with the public and/or personal entities in entity files stored within the on-device repository. In this example, the automatically completed user query can be utilized to determine the application that provides access to the entity, and to generate and render a suggestion suggesting to launch the application.

As a further example, the on-device search engine of the user device can process an entity name of the entity identified from the user query which does not identify any application, using a trained probabilistic model, to generate an output that indicates one or more probabilities for the entity to be present in each of one or more application installed at the user device. Based on the generated output, the on-device search engine can generate and render one or more suggestions, as described above. In these ways, not only user experience is enhanced, but the chances of processing multiple user queries in order to successfully identify and/or trigger the corresponding application is reduced, which results in reduced consumption of computing and battery resources.

As a working example, a plurality of historical queries can be identified from one or more computing devices. The plurality of historical queries can be in a form of "search X-on-Y", or any other applicable format identifying both an application and an entity being present in the application. In other words, the plurality of historical queries identified from the one or more computing devices need to be explicit queries that each include both an entity name for an entity and an application name for an application that provides access to the entity.

The plurality of historical queries include, for instance, a first historical query generated based on a first user searching for (accessing, or another action such as tapping to pay) a particular entity (i.e., "credit card X") via a particular application (i.e., "digital wallet Y") that is installed at a first computing device. The first historical query can, for instance, be generated in form of "<credit card X> <digital wallet Y> <first user>", "<digital wallet Y> <credit card X> <first user>", "<credit card X> in <digital wallet Y> <first user>", or any other appropriate form. Here, "credit card X" is an entity name for the particular entity of "credit card X", and "digital wallet Y" is an application name for the particular application of "digital wallet Y". In some implementations, optionally or additionally, the first historical query can include, or be generated in association with, a user action defining user interaction with the credit card X within digital wallet Y. For instance, the first historical query can be associated with, or determined from, a user action of "searching" credit card X within digital wallet Y.

Alternatively or additionally, the plurality of historical queries can include a second historical query generated based on a second user (the same as or different from the first user) searching for "movie A" using a search engine of a movie app B, where the movie app B is installed at a second computing device (the same as or different from the first computing device). The second historical query can be generated, for instance, in a form of "<movie A><movie app B> <second user>" or any other appropriate form. The first and second historical queries described herein are for illustrative purposes and shall not be considered as limiting the scope of the present disclosure.

The plurality of historical queries can be processed to generate one or more training instances to train a model (e.g., the aforementioned probabilistic model) in processing (or responding to) queries that do not identify any application name. The model can be a machine learning model.

In some implementations, the plurality of historical queries can be divided, using a map-reduce engine, to generate a set of query files, where each query file of the set includes one or more historical queries from the plurality of historical queries. Each query file can be assigned to a corresponding mapper (i.e., a processing module) of a set of mappers, where the corresponding mapper can process a respective query file to generate a corresponding intermediate output (e.g., one or more key-value pairs in which an application can be a key and one or more entities associated with the application can be value(s) corresponding to the key).

The set of intermediate outputs generated by the set of mappers can be processed by one or more reducers as input, to generate a final output indicating public and/or personal entities determined from the plurality of historical queries. It's noted that the number of intermediate outputs does not necessarily equate to the number of reducers. The number of reducers utilized in processing the set of intermediate outputs may be based on the number of different keys present in the set of intermediate outputs.

In some implementations, the final output can be processed to generate one or more entity files, where each of the one or more entity files is for a corresponding application, and where each of the one or more entity files include one or more public and/or personal entities present in the corresponding application. In some implementations, metadata associated with fulfilling (partially or fully) one or more actions (e.g., a search) of a public or personal entity within the corresponding application can be retrieved/determined and be stored in the entity file that includes the public or personal entity. In some implementations, an entity file for an application can be stored locally at a user device in response to determining that the application is installed at the user device. In this case, if the user device includes a first application and a second application, a first entity file for the first application and a second entity file for the second application can be stored locally at the user device in response to determining that the first application and the second application are installed at the user device.

As a non-limiting example, based on the final output generated by the one or more reducers, "credit card X" can be determined as a personal entity that is present in "digital wallet Y". In this example, an entity file for "digital wallet Y" can be stored locally at a local device in response to determining that "digital wallet Y" is installed at the local device. Alternatively, an association between "credit card X" and "digital wallet Y" can be determined, and be stored locally at the local device in response to determining that the "digital wallet Y" is installed at the local device. In some implementations, fulfillment information for fulfilling an action (e.g., searching) with respect to "credit card X" within "digital wallet Y" can be retrieved and be stored locally in association with "credit card X" at the local device.

Continuing with this working example, a user query (e.g., typed input of "credit card X" or audio input of "Assistant, credit card X, please") can be subsequently received at the local device via an on-device search engine (which can be a unified search engine not specific to any applications installed at the local device, or via an automated assistant or other chatbot). The user query is an incomplete query that identifies only the entity ("credit card X") but no application. In response to receiving the incomplete query, the on-device repository can be searched to determine a public or personal entity that matches the entity identified by the incomplete query, so that an application that provides access to the entity can be identified. In some implementations, the entity may match a public entity (e.g., the public entity being present in different entity files each for a different application) that is associated with different applications. In these implementations, the aforementioned probabilistic model can process an entity name of the entity as input, to generate an output indicating a plurality of probabilities each suggesting a likelihood the entity is present in a corresponding application of a plurality of applications installed at the local device. Based on the plurality of probabilities, one or more application can be selected from the plurality of applications, and one or more suggestions suggesting the user to access the entity via the one or more applications can be generated based on fulfillment information from the on-device repository that enables fulfillment of an action of the entity within each of the one or more selected applications. The one or more suggestions can be rendered to a user of the local device as a search result responsive to the incomplete query from the user. Each of the one or more suggestions, for example, can be rendered in a selectable format that, when selected, causes corresponding fulfillment information to be executed, so that a corresponding application is triggered to provide access to the entity.

The above is provided merely as an overview of some implementations. There are a variety of other implementations for performing the function and/or advantages described herein. Those and/or other implementations are disclosed in more detail herein and/or later in this disclosure. For instance, instead of (or in addition to) generating one or more entity files each associated with an application, one or more entity databases can be generated. The one or more entity databases can include, for instance, one or more personal entity databases and/or a public entity database. The one or more personal entity databases can be generated each for a corresponding user. For instance, a first user may have a first registered account of a device and a second user may have a second registered account of the device, and the device may locally store a first personal entity database for the first user and a second personal entity database for the second user. The first personal entity database may only be accessed by an authorized user (e.g., the first user or another user authorized by the first user). The second personal entity database may only be accessed by an authorized user (e.g., the second user or another user authorized by the second user). The first personal entity database (or the second personal entity database) can include a plurality of entries each including a personal entity (or an identifier of the personal entity) and metadata associated with the personal entity (or the identifier thereof), where the metadata can include an application associated with the personal entity (e.g., an application that donates the personal entity), an application action performed based on a historical query that identifies the application and the personal entity, a natural language intent and associated parameters previously determined for performing the application action, context data indicating a context when the application action was previously performed, and/or the historical query identifying the application and the personal entity, etc.

The public entity database can include a plurality of entries each including a public entity (or an identifier of the personal entity) and metadata associated with the public entity, where the metadata can include an application associated with the public entity (e.g., an application that donates the public entity), an application action performed based on a historical query that identifies the application and the public entity, a natural language intent and associated parameters previously determined for performing the application action, context data indicating a context when the application action was previously performed, and/or the historical query identifying the application and the public entity, etc. It is noted that, unlike the personal entity database(s) which can each be specific to a distinct user, the public entity database can be associated with multiple users as a public entity is an entity present in over a threshold number of historical queries mentioning a same application that are issued by over a threshold number of users.

Optionally, the one or more personal entity databases and/or the public entity database can be generated based on the aforementioned entity files. For instance, given a plurality of entity files each listing entities corresponding to a distinct application, metadata for entities indicating user(s) associated with the entities can be utilized to group the entities from the plurality of entity files into one or more entity databases (e.g., the one or more personal entity databases each specific to a distinct user, and/or the public entity database). Optionally, the one or more personal entity databases and/or the public entity database can be generated based on processing historical queries (e.g., search X on Y) that each include or indicate an entity (e.g., "X") and an application (e.g., "Y") for accessing the entity and/or historical data associated with the historical queries. The historical data associated with a historical query can include fulfillment data, such as a deeplink that was previously generated based on the historical query for performing an application action (e.g., "search") with respect to the entity "X". As a non-limiting example, a particular user may have provided different historical input (e.g., each including an in-app entity and/or a corresponding app) within or directed to different applications (e.g., a camera application, a social media application, a banking application, etc.) that are installed at a particular device of the particular user. In this case, different historical queries each showing an association between an in-app entity and an application for accessing the in-app entity can be donated by the different applications that are installed at the particular device, to form a personal entity database that is specific to the particular user. The personal entity database for the particular user can be stored at the particular device in association with the particular user.

To generate the personal entity database, the different historical queries, for instance, can each be processed to determine whether a personal entity is included therein, and if a historical query (of the different historical queries) is determined to include a personal entity, an entry can be created in the personal entity database for the personal entity based on the historical query and historical data associated with the historical query. For instance, the entry can include an application name (or application identifier) of the application that donates the personal entity (and/or other metadata such as a natural language intent associated with the personal entity and the application, an application action performed using such natural language intent and/or parameter(s) associated with the natural language input, etc.). In some implementations, to determine a historical query (of the different historical queries) includes a personal entity, whether any entity included in the historical query includes personal information (and therefore is a personal entity) can be determined. In some other implementations, the aforementioned entity files can be utilized to determine whether any entity included in the historical query is a personal entity previously accessed by the particular user using the particular device.

In some implementations, after being generated, the one or more personal entity databases and/or the public entity database can be utilized to determine whether an entity included in a user query (that identifies no application and that is to be understood) is a personal entity or a public entity. For instance, a user may provide a query (a typed input of "SF") not identifying any application, and the query not identifying any application can be processed to determine one or more entities (e.g., "SF", "SFO", "SFMOMA", etc.). Using the one or more personal entity databases and/or the public entity database (or using the aforementioned entity files), whether any of the one or more entities is, matches, or corresponds to, a personal entity can be determined, and if a particular entity of the one or more entities is determined to be (or match, or corresponds to) a personal entity, a suggestion that is generated to suggest an application (or application action) to perform an action with respect to the personal entity can be boosted for display to a user, while other suggestions that suggest applications or application actions in association with entities not determined to be/match/corresponds to personal entities are at least not boosted (or can be even filtered out). This way, chances of a user seeing a desired suggestion can be improved, thereby avoiding elongated human-to-computer interactions where the user have to try several user queries to be entertained with a desired suggestion that enables access to a desired application (or that enables performance of a desired application action).

In various implementations, given a user query (from a user, e.g., a recognized user that is recognized based on a voice input, fingerprint, facial recognition, password, etc.) not specifying any application, whether the user query that specifies no application is a single-word query that includes (and only includes) a single word (or multiple words) can be determined. In response to determining that the user query (that specifies no application) is a single-word query (e.g., a completely typed word such as "SFO", a typed word such as "SF" that can correspond to multiple words-"SF" and "SFO", a single-word utterance, etc.), one or more entities can be derived from the single-word query and the single word in the single-word query can be applied to search a personal entity database of the user. It is noted that deriving the one or more entities from the single-word query (e.g., using a named entity recognition (NER) engine) and searching the personal entity database of the user using the single word as a search term can be, but does not necessarily need to be, performed in parallel.

In some implementations, the NER engine can determine an entity type and/or a ranking score for each of the one or more entities derived from the single-word query. In some implementations, the user query can be applied as a search term to search the personal entity database of the user for any personal entity of the user that matches the single-word query. The personal entity database herein can store personal entities donated by one or more applications with which the user has a correspondingly registered account. If the single-word query is determined to match a personal entity (e.g., having a matching score satisfying a matching threshold) within the personal entity database of the user, the single-word query can be marked/labeled (e.g., as matching a personal entity).

For the one or more entities, one or more applications via which the one or more entities can be accessed are determined. Alternatively or additionally, application actions with respect to the one or more entities and associated fulfillment data (e.g., a deeplink which when selected, causes a corresponding application action to be performed) can be determined. In various implementations, a suggestion that is responsive to the single-word query and that is to suggest an application selected from one or more applications (or that is to suggest an application action from the one or more application actions) that corresponds to the matched personal entity can be boosted, compared to other suggestions responsive to the single-word query but suggest other application(s) or application action(s) that do not match/correspond to a personal entity.

It is noted that the personal entity determined to match the single-word query may or may not be included in the one or more entities derived from the single-word query. If the personal entity determined to match the single-word query is included in the one or more entities derived from the single-word query, suggestions for the one or more entities (derived from the single-word query) can be generated respectively, and a suggestion for an entity that matches the personal entity can be boosted while the other suggestions are not. If the personal entity determined to match the single-word query is not included in the one or more entities derived from the single-word query, a suggestion for the personal entity can be generated, in addition to generating suggestions for the one or more entities (derived from the single-word query), where the suggestion for the personal entity can be boosted while the other suggestions are not.

In some implementations, instead of applying the user query as a search term to search the entity database for any matching personal entity, each of the one or more entities can be applied as a search term to search the personal entity database. Correspondingly, a suggestion that suggests an application selected from the one or more applications (or that suggests an application action selected from the one or more application actions) and that matches a personal entity in the personal entity database can be boosted, while suggestions that suggest other application(s) or application action(s) are not boosted. It is noted that, in these implementations, searching the personal entity database respectively using the one or more entities can be, but does not necessarily need to be, performed in parallel with deriving the one or more applications (or the one or more application actions) from the user query.

It is noted that, in some implementations, the personal entities stored in the entity database can include, but are not limited to include, payment cards accessible and donated by a wallet application, one or more files within folders accessible and donated by one or more applications, alarm(s) or timer(s) accessible and donated by a Clock application, open tab(s) and bookmark(s) accessible and donated by a browser application, note(s) and list(s) accessible and donated by a note application, save collection(s) accessible and donated by an information-saving application, subscribed channel(s) accessible or donated by a media player application, event(s) accessible and donated by a calendar application.

Various implementations can include a non-transitory computer readable storage medium storing instructions executable by a processor to perform a method such as one or more of the methods described herein. Yet other various implementations can include a system including memory and one or more hardware processors operable to execute instructions, stored in the memory, to perform a method such as one or more of the methods described herein.

BRIEF DESCRIPTION OF THE DRAWINGS

The above and other aspects, features, and advantages of certain implementations of the present disclosure will be more apparent from the following description taken in conjunction with the accompanying drawings. In the drawings.

DETAILED DESCRIPTION

The following description with reference to the accompanying drawings is provided for understanding of various implementations of the present disclosure. It's appreciated that different features from different implementations may be combined with and/or exchanged for one another. In addition, those of ordinary skill in the art will recognize that various changes and modifications of the various implementations described herein can be made without departing from the scope and spirit of the present disclosure. Descriptions of well-known or repeated functions and constructions may be omitted for clarity and conciseness.

The terms and words used in the following description and claims are not limited to the bibliographical meanings, and are merely used to enable a clear and consistent understanding of the present disclosure. Accordingly, it should be apparent to those skilled in the art that the following description of various implementations of the present disclosure is provided for the purpose of illustration only and not for the purpose of limiting the present disclosure as defined by the appended claims and their equivalents.

Figure 1A:
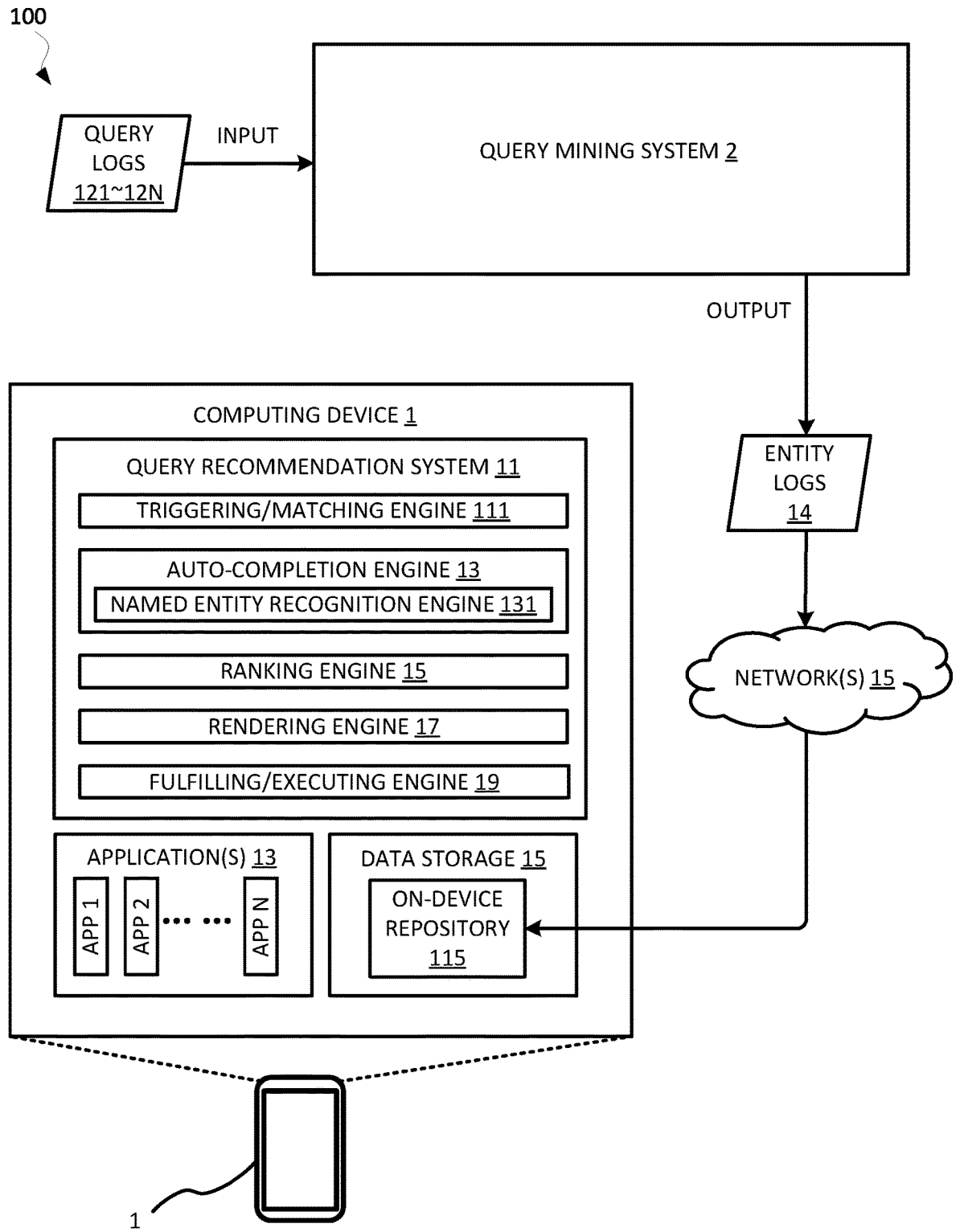
FIG. 1A depicts a block diagram of an example environment that demonstrates various aspects of the present disclosure, and in which implementations disclosed herein may be implemented.

FIG. 1A depicts a block diagram of an example environment 100 that demonstrates various aspects of the present disclosure, and in which implementations disclosed herein may be implemented. As shown in FIG. 1A, the example environment 100 can include: a computing device 1, and a query mining system 2 in communication with the computing device 1. The query mining system 2 can be in communication with the computing device 1 via one or more networks 15. The computing device 1 (may also be referred to as "client device", "user device" or "local device") can be, for example, a cell phone, a laptop, a desktop, a notebook computer, a tablet, a smart TV, a messaging device, or a personal digital assistant (PDA), and the present disclosure is not limited thereto. The query mining system 2 can be, or can otherwise include, a parallel data processing system such as MapReduce that assigns processing resources to function as a plurality of mappers and one or more reducers, where the plurality of mappers can process input data in parallel using one or more map functions to generate a plurality of intermediate output, and the one or more reducers can process the plurality of intermediate output in parallel to generate a final output (e.g., indicating one or more public entities and/or one or more personal entities for each of one or more applications). More descriptions of the query mining system 2 can be found later in this specification.

In various implementations, the computing device 1 can include a query recommendation system 11, one or more applications 13, and/or a data storage 15. The computing device 1 can further include one or more user interface input devices (not shown) such as a keyboard, pointing devices such as a mouse, trackball, touchpad, or graphics tablet, a scanner, a touch screen incorporated into the display, audio input devices such as voice recognition systems, microphones, and/or other types of input devices. The computing device 1 can further include one or more user interface output devices such as a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display (e.g., audio data) via audio output devices.

In various implementations, the query recommendation system 11 can be, or can include an on-device search engine, including: a triggering/matching engine 111, an auto-completion engine 113, a ranking engine 115, a rendering engine 117, and/or a fulfilling/executing engine 119. The one or more applications 13 can include, for example, app 1 (e.g., a social media app), app 2 (e.g., a music application), . . . , and app N (e.g., digital wallet). Optionally, the one or more applications 13 can further include an automated assistant application (sometimes referred to as "automated assistant", "chatbot", etc.). The data storage 15 can include, for example, an on-device repository 115. The on-device repository 115 can include, for example, one or more public entities stored in association with metadata (e.g., fulfillment data) of the one or more public entities, and/or one or more personal entities stored in association with metadata of the one or more personal entities. In some implementations, the one or more public entities, and/or the one or more personal entities, can be determined based on the aforementioned final output of the query mining system 2. More descriptions of the public or personal entities can be found later in this disclosure.

The triggering/matching engine 111 can process an incomplete query that identifies an entity but no application for accessing the entity, to determine whether the incomplete query triggers any of the one or more applications 13, and/or to determine whether the incomplete query matches any entry from the one or more public or personal entities stored in the on-device repository 115. The auto-completion engine 113 can, in response to the triggering/matching engine 111 determining that the incomplete query matches a particular entity from the one or more public or personal entries from the on-device repository 115, determine at least one application associated with the particular entity based on entries in the on-device repository 115 that each stores the particular entity in association with a corresponding application (and/or metadata such as fulfillment information for fulfilling an action with respect to the particular entity within the corresponding application).

The auto-completion engine 113 can automatically generate one or more complete queries based on the particular entity and one or more determined applications (and/or the associated fulfillment information). The ranking engine 115 can rank the one or more complete queries based on one or more ranking criteria (e.g., frequency, click-through rate, etc., default setting by a user that provides the incomplete query). Alternatively or additionally, the ranking engine 115 can rank the at least one application, to select one or more top ranked applications from the at least one application to generate corresponding suggestion(s). The rendering engine 117 can render the one or more top ranked complete queries determined by the ranking engine 15, for example, using a drop-down menu (or any other appropriate format such as one or more graphical user interface elements). In some implementations, the rendering engine 117 can render the one or more complete queries (or a portion thereof, such as the top ranked ones) in a manner where each of the one or more rendered complete queries is embedded with fulfillment information (e.g., a deeplink). Alternatively or additionally, the rendering engine 117 can generate and render suggestion(s) responsive to the incomplete query, without rendering top ranked complete queries. Each of the rendered suggestion(s), when selected, can cause execution of fulfillment information for fulfilling an action of the particular entity within a corresponding application.

The fulfillment information, for instance, can enable an application that corresponds to the particular entity identified by the incomplete query, to be triggered. The fulfillment information can further enable a search (or other action) for the entity to be performed within the triggered application. The fulfilling/executing engine 119 can, in response to a user selecting one of the one or more rendered complete queries, utilize the fulfillment information of the selected complete query, to cause the application that corresponds to the selected entity to be triggered and/or the search (or other action) for the entity to be performed within the triggered application. As a result, the query recommendation system 11 allows the user to implicitly trigger a desired application (i.e., the triggered application) by providing an incomplete query that identifies an entity but not any application. In other words, the user does not need to provide a complete query that identifies both the entity and the desired application in order to access the entity within the desired application.

In some implementations, the incomplete query can be an audible query identifying a desired entity but not an application to access the desired entity. The audible query can be received via an automated assistant application (sometimes referred to as "automated assistant" as mentioned above, or can be otherwise be a chatbot, etc.) installed at, or otherwise accessible, via the computing device 1. In some implementations, the automated assistant can include a plurality of components including an automatic speech recognition (ASR) engine, a text-to-speech (TTS) engine, a natural language understanding (NLU) engine, and/or a fulfillment engine. The ASR engine can process audio data that captures a spoken utterance to generate a speech recognition of the spoken utterance. The NLU engine can determine semantic meaning(s) of audio (e.g., the aforementioned audio data capturing the spoken utterance) and/or a text (e.g., natural language content from a message or the aforementioned speech recognition that is converted by the ASR engine from the audio data), and decompose the determined semantic meaning(s) to determine intent(s) and/or parameter(s) for an assistant action. For instance, the NLU engine can process natural language content of "Weather today in Louisville?", to determine a natural language understanding (NLU) intent (e.g., Internet search) and/or parameters (e.g., search parameters including: "weather", "today", and "Louisville", or "Weather today in Louisville?") for an assistant action (e.g., search the Internet for the weather in Louisville today).

In some implementations, the NLU engine can resolve the intent(s) and/or parameter(s) based on a single utterance of a user and, in other situations, prompts can be generated based on unresolved intent(s) and/or parameter(s). In this latter situation, the generated prompts can be rendered to the user to receive user response(s), where the user response(s) to the rendered prompt(s) can be utilized by the NLU engine in resolving intent(s) and/or parameter(s). Optionally, the NLU engine can work in concert with a dialog file manager engine (not illustrated) that determines unresolved intent(s) and/or parameter(s). For instance, the dialog file manager engine can be alternatively or additionally utilized to generate the aforementioned prompt(s). In some implementations, the NLU engine can utilize one or more NLU machine learning models in determining intent(s) and/or parameter(s).

In various implementations, the fulfillment engine of the automated assistant (or a fulfillment engine of the client automated assistant application, which is not illustrated) can receive an intent and/or parameter(s) of the intent, to fulfill the intent by performing a corresponding assistant action. As a non-limiting example, the fulfillment engine can receive the aforementioned intent of Internet search and the aforementioned search parameter of "Weather today in Louisville?", to cause a search engine of the client device 11 to search the Internet for "Weather today in Louisville?". In this example, the fulfillment engine can fulfill the intent by: (1) causing the search engine to search the Internet for the user query, i.e., "Weather today in Louisville?"), (2) generating fulfillment information (e.g., "it's cloudy outside, with a temperature of 26° C."), based on a search result (e.g., "Louisville, KY, Monday 11:00 am, cloudy, 26° C.") of the search, and/or (3) rendering the fulfillment information to the user of the computing device 1. As another non-limiting example, the fulfillment engine can receive an intent and/or parameter(s) for an assistant action that causes a thermostat in the living room to set room temperature at 72 F. In this example, the fulfillment engine can fulfill the intent by generating and forwarding a control signal to the thermostat in the living room, where the control signal causes the thermostat to set the room temperature at 72 F.

Optionally, when the NLU engine cannot resolve the intent(s) and/or cannot determine all parameter(s) for the intent(s), to fulfill an assistant action, the fulfillment engine can generate a default response, such as "Sorry, I don't understand. Please try again. In this case, the default response can be customized based on functions or a type of the automated assistant.

In some implementations, the TTS engine can convert a text (e.g., the aforementioned fulfillment information of "it's cloudy outside, with a temperature of 26° C.") to a synthesized speech using a particular voice. The synthesized speech, for instance, can be generated by using one or more trained speech synthesis neural network models to process the text. The synthesized speech can be audibly rendered via hardware speaker(s) of the computing device 1 (e.g., a stand-alone speaker) or via another device (e.g., a cell phone). In some implementations, the automated assistant can be in communication with a cloud-based automated assistant via one or more networks. The cloud-based automated assistant can have a plurality of cloud-based components, the same as or similar to the plurality of components of the automated assistant, while possessing stronger processing capabilities.

In some implementations, the automated assistant can further include the aforementioned query recommendation system 11. In some other implementations, the query recommendation system 11 can be included in, or be accessible via, a unified search engine having a search interface to receive, e.g., the aforementioned incomplete query, from a user of the computing device 1.

Figure 1B:
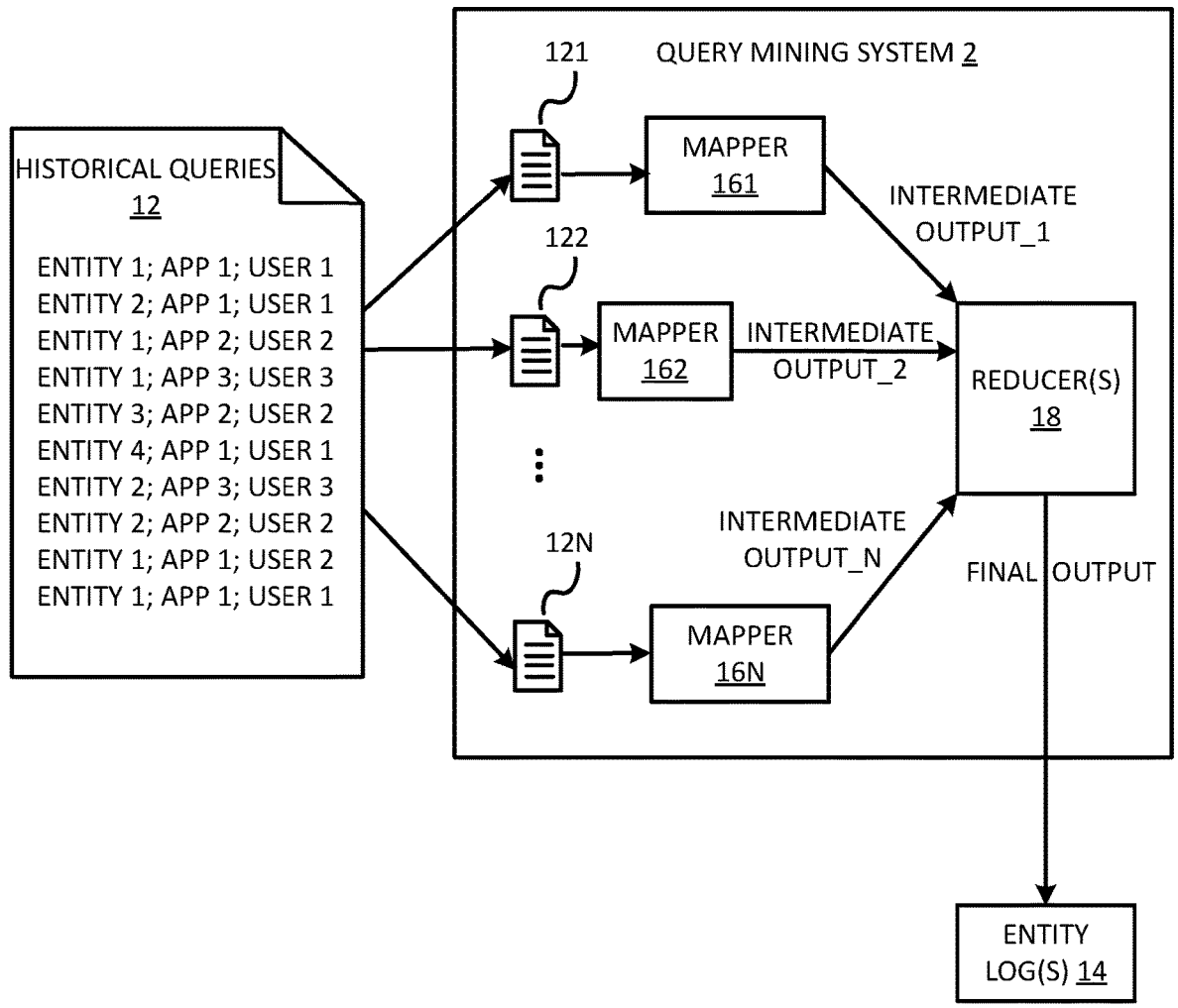
FIG. 1B depicts a flow chart showing determination of public and/or personal entities using a query mining system, in accordance with various implementations.

FIG. 1B depicts a flow chart showing determination of public and/or personal entities using a query mining system (e.g., the query mining system 2 included in the example environment 100 of FIG. 1A), in accordance with various implementations. As shown in FIG. 1B, the query mining system 2 can include one or more mappers (e.g., mapper 161, mapper 162, . . . , mapper 16N) and one or more reducers 18. The query mining system 2 can further include a data-splitting engine (not illustrated) that splits a plurality of historical queries 12 into a plurality of query files (e.g., a first query file 121, a second query file 122, . . . , and an Nth query file 12N). The plurality of historical queries 12 can be explicit queries received from one or more users, where the explicit queries can be received via one or more applications installed at one or more computing devices.

As a non-limiting example, as illustrated in FIG. 1B, the plurality of historical queries 12 can include: a first query submitted by user 1 within app 1 searching for entity 1, a second query submitted by user 1 within app 1 searching for entity 2, a third query submitted by user 2 within app 2 searching for entity 1, a fourth query submitted by user 3 within app 3 searching for entity 1, a fifth query submitted by user 2 within app 2 searching for entity 3, a sixth query submitted by user 1 within app 1 searching for entity 4, a seventh query submitted by user 3 within app 3 searching for entity 2, an eighth query submitted by user 2 within app 2 searching for entity 2, a ninth query submitted by user 2 within app 1 searching for entity 1, a tenth query submitted by user 1 within app 1 searching for entity 1, and/or one or more additional queries. The data-splitting engine can divide or split the plurality of historical queries 12 into a plurality of query files 121, 122, . . . , 12N, where each of the plurality of query files 121, 122, . . . , and 12N include one or more historical queries from the plurality of historical queries 12.

Continuing with the above non-limiting example, query file 121 can include the first query (e.g., "Entity 1; App 1; User 1") and the second query ("Entity 2; App 1; User 1"), query file 122 can include the third query ("Entity 1; App 2; User 2"), . . . , and query file 12N can include a historical query listed at the very end of the plurality of historical queries 12. The data-splitting engine can assign the query file 121 to mapper 161 for processing by the mapper 161, assign the query file 122 to mapper 162 for processing by the mapper 162, . . . , and assign the query file 12N to the mapper 16N for processing by the mapper 16N. The mapper 161 can process the query file 121 as input to generate intermediate output 1, the mapper 162 can process the query file 122 as input to generate intermediate output 2, . . . , and the mapper 16N can process the query file 12N to generate intermediate output N.

The intermediate output 1, 2, . . . , and N can each indicate one or more entity-application pairs. The intermediate output 1, 2, . . . , and N can be shuffled and be processed using the one or more reducers 18. The one or more reducers 18 can process the intermediate output 1, intermediate output 2, . . . , intermediate output N, as input, to generate a final output indicating one or more public entities, for each of the one or more application, that occurred more than a first threshold number of times in the plurality of historical queries 12. Alternatively or additionally, the one or more public entities can be determined as being submitted by over a second threshold number of users from whom the plurality of historical queries 12 were collected. Alternatively or additionally, the final output can indicate one or more personal entities, for each of the one or more applications, that are each specific to a particular user of the one or more users.

In some implementations, the final output can be applied to generate one or more entity files 14 (sometimes referred to as "entity logs"), where each of the one or more entity files 14 is specific to a corresponding application, out of the one or more applications (identified in the explicit queries, or known as "historical queries"). Each of the one or more entity files 14 can list or include all the public entities and/or all the personal entities determined from the plurality of historical queries 12 that are specific to the corresponding application, a count of the public entities or personal entities occurring concurrently with the corresponding application in the plurality of historical queries 12, and/or fulfillment information as discussed previously. In some other implementations, one or more entity databases can be generated, where the one or more entity databases can be generated based on the final output indicating one or more public entities and/or one or more personal entities or based on the one or more entity files that each associated with an application. The one or more entity databases can include, for instance, one or more personal entity databases and/or a public entity database, where the one or more personal entity databases can each correspond to a distinct user and the public entity database can correspond to multiple users.

As a non-limiting example of the one or more entity files 14, a first entity file (of the one or more entity files 14) can be associated with App 1, and can include a first entry identifying Entity 1 (which is determined as a public entity) that is present in (or accessible via) App 1, and a second entry identifying Entity 4 (which is determined as a personal entity) that is present in (or accessible via) App 1. In this non-limiting example, the first entry of the first entity file for App 1 can further include an association between Entity 1 and fulfillment information (e.g., deeplink) for fulfilling an action of Entity 1 within App 1 (and/or other metadata such as NLU intent), and the second entry of the second entity file for App 1 can further include an association between Entity 4 and fulfillment information for fulfilling an action (e.g., search) of Entity 4 within App 1.

In some implementations, the fulfillment information for searching (or performing another action with respect to) Entity 1 (or Entity 4) within App 1 can be retrieved, e.g., from historical data (e.g., one or more previous occurrences in which one or more users performed a search for Entity 1 or Entity 4 within App 1) associated with the plurality of historical queries 12. As one example, the fulfillment information can be a URL link that, when selected, causes the App 1 to be launched, and Entity 1 to be searched within the launched App 1. As another example, the fulfillment information can include an intent and/or parameters that, when selected, causes the aforementioned automated assistant to launch App 1 and perform a search for Entity 1 within the launched App 1.

Based on the one or more applications 13 installed at the computing device 1, one or more of the entity files 14 can be selected and stored locally at the computing device 1. For example, in response to determining that the computing device 1 is installed with App 1, App 2, and App 3, entity file for App 1, entity file for App 2, and entity file for App 3 can be selected and be stored locally at the on-device repository 115 of the computing device 1.

Continuing with the above example, in some implementations, the entity file for App 1, the entity file for App 2, and the entity file for App 3 can be applied to generate one or more training instances to train a probabilistic model. The trained probabilistic model can process an entity name of a given entity as input, to predict three probabilities. The three probabilities can include a first probability indicating a likelihood that the given entity is present in App 1, a second probability indicating a likelihood that the given entity is present in App 2, and a third probability indicating a likelihood that the given entity is present in App 3. Based on the three probabilities, one or more of App 1, App 2, and App 3 can be determined and/or selected to access the given entity.

Alternatively, in some implementations, based on the one or more entity files 14, one or more entries each mapping a public or personal entity to fulfillment information for performing an action (e.g., search) with respect to the public or personal entity within a corresponding application can be generated, and be further stored within the on-device repository 115. Subsequent to the one or more entries generated using the one or more entity files 14 (and/or using associated metadata) being stored in the on-device repository 115, the one-device repository 115 can be utilized to determine, in response to receiving an incomplete query identifying a particular entity but no particular application that is associated with the particular entity, whether the incomplete query matches any of the one or more entries or entities in the on-device repository 115.

As a non-limiting example of the one or more entity databases, the one or more entity databases can include a first personal entity database storing personal entities in association with a first user and/or a second personal entity database storing personal entities in association with a second user (which is different from the first user). The one or more entity databases can further include a public entity database storing public entities associated with multiple users. The first personal entity database, for instance, can include one or more entries identifying one or more personal entities that are specific to user 1, where the one or more personal entities can be accessible via one or more applications using which user 1 previously accessed the one or more personal entities. Each of the one or more entries in the first personal entity database can include metadata associated with a personal entity that is specific to user 1. Such metadata can include or indicate an application using which user 1 accessed the personal entity, an application action that is performed via the application in association with the personal entity, and/or fulfillment information for fulfilling the application action (or fulfillment information that causes the application to be launched, e.g., in a state where a particular user interface is displayed for performance of the application action). The fulfillment information can be, for instance, a deep link that identifies the application action or the application, where the deep link when executed, causes the application to be launched (or causes performance of the application action via the application).

The second personal entity database, for instance, can include one or more entries identifying one or more personal entities that are specific to user 2, where the one or more personal entities can be accessible via one or more applications using which user 2 previously accessed the one or more personal entities. Each of the entries in the second personal entity database can identify a personal entity specific to user 2, an application associated with the personal entity specific to user 2, an application action associated with the personal entity specific to user 2, and/or fulfillment information associated with the personal entity specific to user 2. Descriptions of content included in an entry of the first and/or second personal entity databases (or other personal entity database) are not limited herein, and the entry can include, for instance, a NLU intent associated with the personal entity specific to user 2 instead of or in addition to the fulfillment information associated with the personal entity specific to user 2.

As described above, the public entity database (of the one or more entity databases) can further include public entities associated with multiple users. As described above, a "public entity" means an entity present in over a threshold number of historical queries mentioning a same application that are issued by over a threshold number of users. For example, "SFO" can be determined as a public entity if "SFO" is found in over a certain number of historical queries issued by over a certain number of users using a traveling application. In this example, the public entity database can include an entry identifying the public entity of "SFO", the traveling application, an action (e.g., search) associated with the public entity of "SFO", and/or fulfillment data to fulfill the action. In some implementations, the entry identifying the public entity of "SFO" can identify more than one application (e.g., a traveling application, a navigation application, etc.), more than one application action (performable via the same application or via different applications). For instance, the entry identifying the public entity of "SFO" can include a first application action of "navigation" performable via a navigation application and can include a second application action of "booking a ticket" performable via a traveling application. In this case, the entry identifying the public entity of "SFO" can include (or can be associated with) fulfillment data for fulfilling the first application action of "navigation" via the navigation application and fulfillment data for fulfilling the second application action of "booking a ticket" via the traveling application.

As described above, in some implementations, the fulfillment information for a personal entity (in an entry of a personal entity database) that is specific to a user can be determined or retrieved, e.g., from historical data (e.g., one or more previous occurrences in which the user performed a search or other action with respect to the personal entity using an application). The historical data, for instance, can include contextual data (e.g., parameter(s)) using which the search (or the other action) was performed in response to a historical query from the user. The historical data, for instance, can include a deeplink that was previously generated by the application to cause performance of the search (or the other action) of the personal entity. In this case, the deeplink in the historical data can be retrieved as the fulfillment information to be included in (or to be associated with) the entry of the personal entity database that stores the personal entity.

In some implementations, the one or more personal entity databases and the public entity database can be stored/distributed at one or more server computing devices. In some implementations, the one or more personal entity databases and the public entity database can be accessed by the computing device 1. In some implementations, the one or more personal entity databases and the public entity database can be selectively downloaded and/or stored locally at the computing device 1. For instance, based on the computing device 1 being registered with a first user, a personal entity database storing personal entities specific to the first user, or a copy thereof, can be selected and be locally stored at the computing device 1, to reduce network resources or other resources when access to an personal entity specific to the first user is needed/desired. For similar reasons, additionally or alternatively, the public entity database or a copy thereof can be stored locally at the computing device 1.

Figure 2:
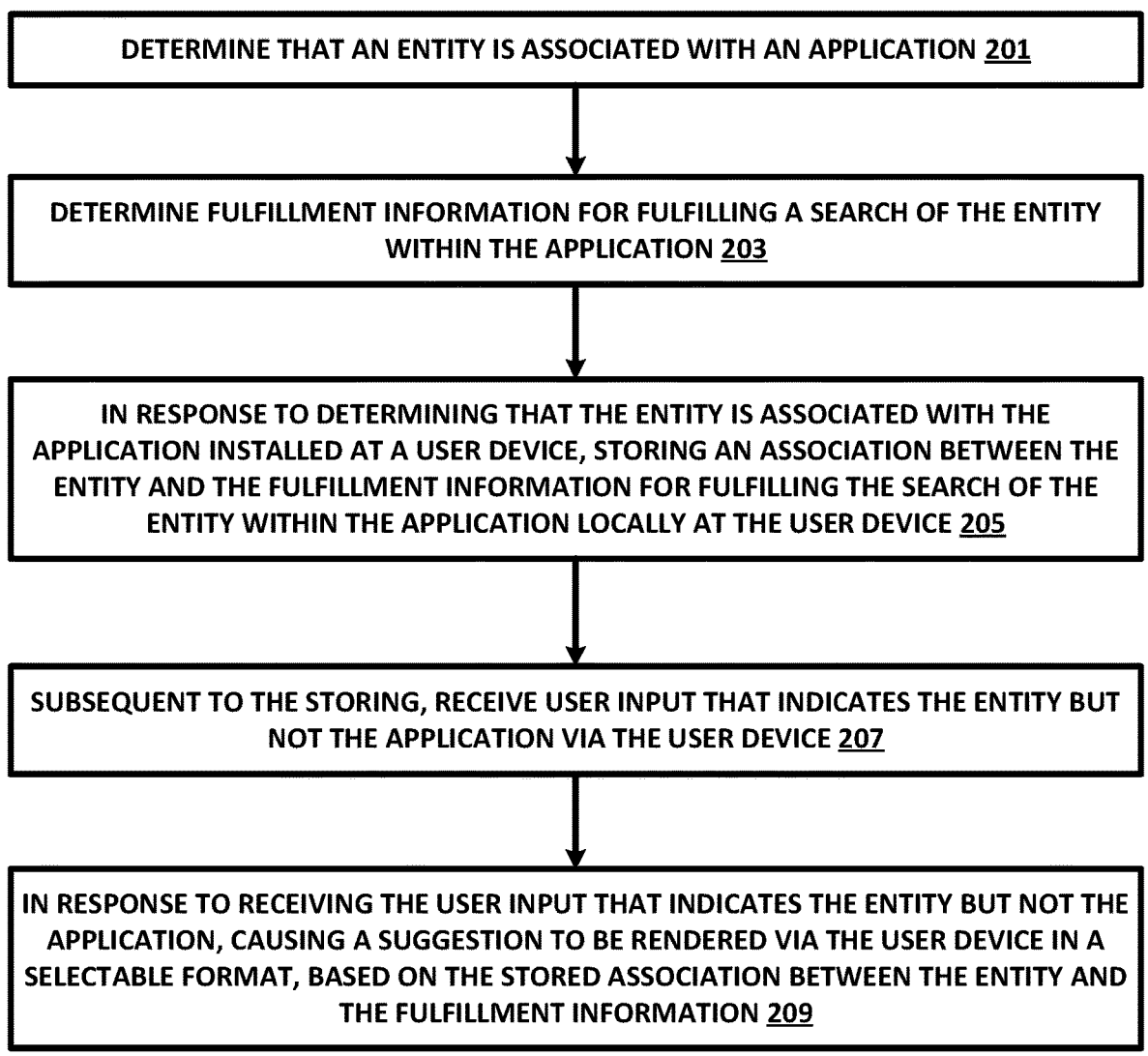
FIG. 2 illustrates an example method for implicit triggering of an application to perform an action associated with an entity identified by an incomplete query, in accordance with various implementations.

FIG. 2 illustrates an example method for implicit triggering, in accordance with various implementations. For convenience, the operations of the method 200 are described with reference to a system that performs the operations. The system of method 200 includes one or more processors and/or other component(s) of a client device and/or of a server device. Moreover, while operations of the method 200 are shown in a particular order, this is not meant to be limiting. One or more operations may be reordered, omitted, or added.

Referring to FIG. 2, in various implementations, at block 201, the system can determine that an entity is associated with an application. In some implementations, the entity here can be a public entity, or can be a personal entity. A "public entity" means, given a plurality of historical queries, the entity is present in over a first threshold number of historical queries, among the plurality of historical queries, that were issued/submitted by over a second threshold number of users. In some implementations, public entities for each application installed at a user device can be determined. A "personal entity" means an entity collected from the plurality of historical queries that is specific to a user. As a non-limiting example, the entity can be a plant called "daffodil", and the application can be a "digital album" installed at the user device of a particular user.

In various implementations, at block 203, the system can determine fulfillment information for fulfilling an action (e.g., search) of the entity within the application. As a non-limiting example, the fulfillment information can include a deeplink that, when selected, causes the action of the entity to be performed within the application. Continuing with the above non-limiting example, the system can determine, from historical data, that the particular user searched for "daffodil" with "digital album" on a certain date. In this example, metadata (e.g., fulfillment data causing a search of "daffodil" with "digital album") associated with an action of the user searching for "daffodil" with "digital album" can be retrieved.

In various implementations, at block 205, the system can store, in response to determining that the entity is associated with the application, an association between the entity and the fulfillment information for fulfilling the search of the entity within the application. The system can store such association as an entry in an on-device repository accessible at, or via, a local device. Continuing with the above non-limiting example, the system can store an association between the entity "daffodil" and the fulfillment information for fulfilling the search of the entity "daffodil" within the application "digital album" in the on-device repository.

In various implementations, at block 207, subsequent to the association being stored (e.g., in the on-device repository), the system can receive user input from a user that indicates the entity but not the application (or not any application). The user input here is therefore an incomplete query. Continuing with the above non-limiting example, the user input that indicates the entity but not the application can be, for instance, an audible input of "Assistant, show me the daffodil", or "Assistant, show me the narcissus". Alternatively, the user input that indicates the entity but not the application can be, for instance, a typed input received from the user via an on-device search engine that is not specific to any application installed at the user device. Continuing with the above non-limiting example, the user input that indicates the entity but not the application can be, for instance, a typed input of "daffodil" or "narcissus".

In various implementations, at block 209, in response to receiving the user input that indicates the entity but not the application, the system can cause a suggestion to be rendered in a selectable format, based on the stored association between the entity and the fulfillment information for fulfilling the search of the entity within the application. For example, the system, in response to receiving the user input that indicates the entity but not the application, can access the on-device repository storing the association between the entity and the fulfillment information for fulfilling the search of the entity within the application, to determine the fulfillment information for fulfilling the search of the entity within the application. Based on the fulfillment for fulfilling the search of the entity within the application, the system can generate a suggestion and cause the suggestion to be rendered to the user. The suggestion can be a selectable element embedded with the fulfillment information, where the suggestion, when selected, causes the fulfillment information to be executed, so that the application can be triggered to be launched and/or an action (e.g., search) of the entity can be performed within the application.

It's noted that the system described herein can match an incomplete query of "Assistant, show me the daffodil" to an association stored in an entry of the on-device repository that associates an entity of "narcissus" with an application of "digital album", based on "daffodil" being a common name of "narcissus" or is often used interchangeably with "narcissus".

Figure 3:
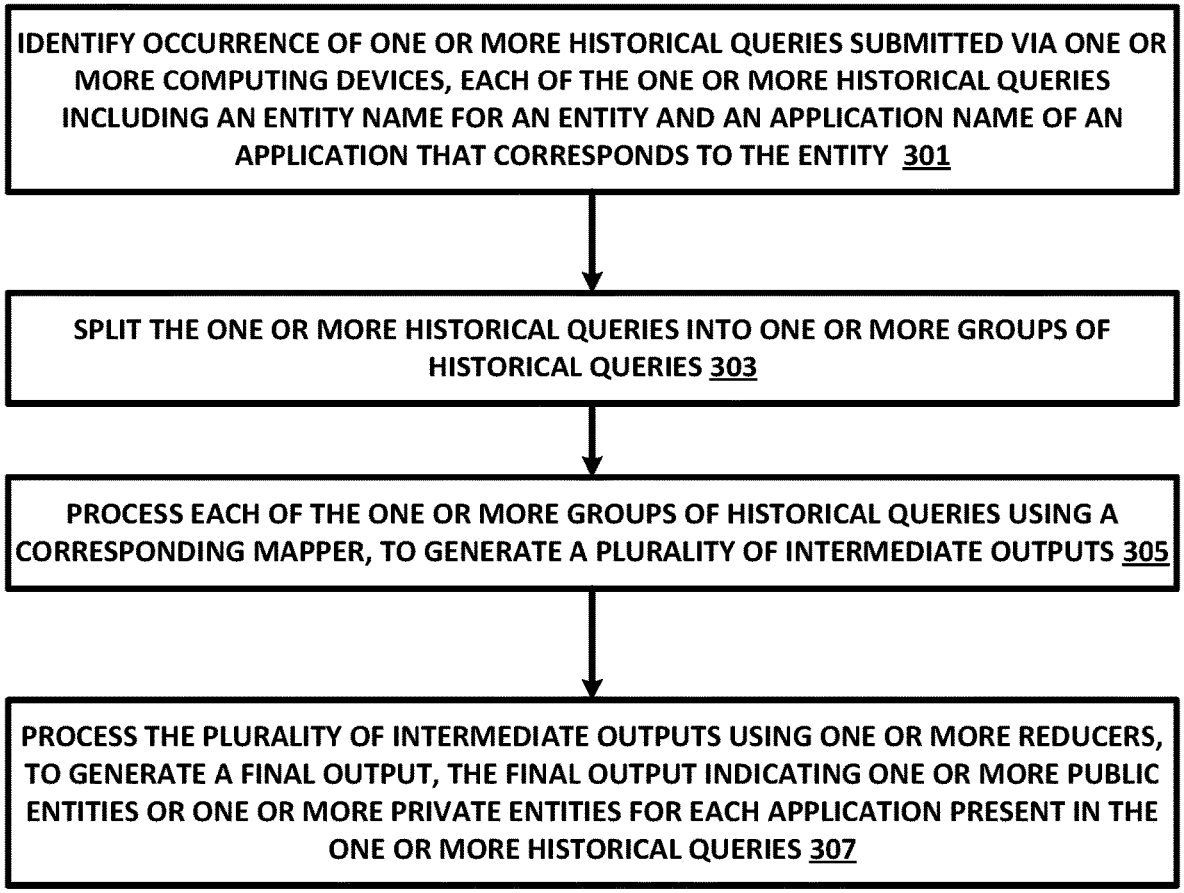
FIG. 3 illustrates an example method for determining public and/or personal entities, in accordance with various implementations.

FIG. 3 illustrates an example method 300 for determining public and/or personal entities, in accordance with various implementations. For convenience, the operations of the method 300 are described with reference to a system that performs the operations. The system of method 300 includes one or more processors and/or other component(s) of a client device and/or of a server device. Moreover, while operations of the method 300 are shown in a particular order, this is not meant to be limiting. One or more operations may be reordered, omitted, or added.

Referring to FIG. 3, in various implementations, at block 301, the system can identify occurrence of one or more historical queries submitted via one or more computing devices, where each of the one or more historical queries includes an entity name for an entity and an application name of an application that corresponds to the entity. The entity name for the respective entity can be, for instance, a name (official, unofficial, etc.) of the respective entity, an identifier of the respective entity, or can be in any other appropriate format to identify or characterize the respective entity. The application name for the respective entity can be, for instance, an application nickname (e.g., E-Wallet for "digital wallet"), an application name synonym (e.g., DW for "digital wallet"), an application type name (e.g., wallet for "digital wallet"), or can be in any other appropriate format to identify or characterize the respective application. It's noted that the entity name or application name is not limited to descriptions herein. Optionally, the one or more historical queries can further include, for each of the one or more historical queries, a user ID for a user submitting the corresponding historical query, e.g., to determine whether the corresponding history query includes a personal entity. In some implementations, a total number of the one or more historical queries can be in the order of hundreds or thousands or even more. In these implementations, the one or more historical queries can be processed in parallel using a Mapreduce model/system.

In various implementations, at block 303, the system can split the one or more historical queries to generate one or more query files. Each query file can have a corresponding group of historical queries). As a non-limiting example, the one or more historical queries can be split to generate a first query log, a second query log, . . . , and a Nth query log, where each query file includes one or more of the aforementioned historical queries that each explicitly includes an entity name for an entity and an application name of an application that corresponds to the entity.

In various implementations, at block 305, the system can process each of the one or more query files using a corresponding mapper, to generate a plurality of intermediate outputs. Given the non-limiting example above, the system can include N mappers to respectively process the first query log, the second query log, . . . , and the Nth query log, to correspondingly generate N intermediate outputs (e.g., entity-application pairs), where N is greater than or equal to 2.

In various implementations, at block 307, the system can process the plurality of intermediate outputs using one or more reducers, to generate a final output, where the final output can indicate, for each application present in the occurrence of one or more historical queries, one or more public entities (and/or one or more personal entities) that are present in a corresponding application. As a non-limiting example, given only two applications (i.e., first app and second app) being present in the occurrence of one or more historical queries, the N intermediate outputs can be shuffled and processed by, e.g., two reducers that includes a first reducer and a second reducer. In this example, the first reducer can process one or more of the N intermediate outputs associated with the first app and the second reducer and process the rest of the N intermediate outputs associated with the second app, to generate a final output that indicate public and/or personal entities for the first app and public and/or personal entities for the second app. Based on the final output, an entity file for the first app and an entity file for the second app can be determined and/or generated.

Figure 4:
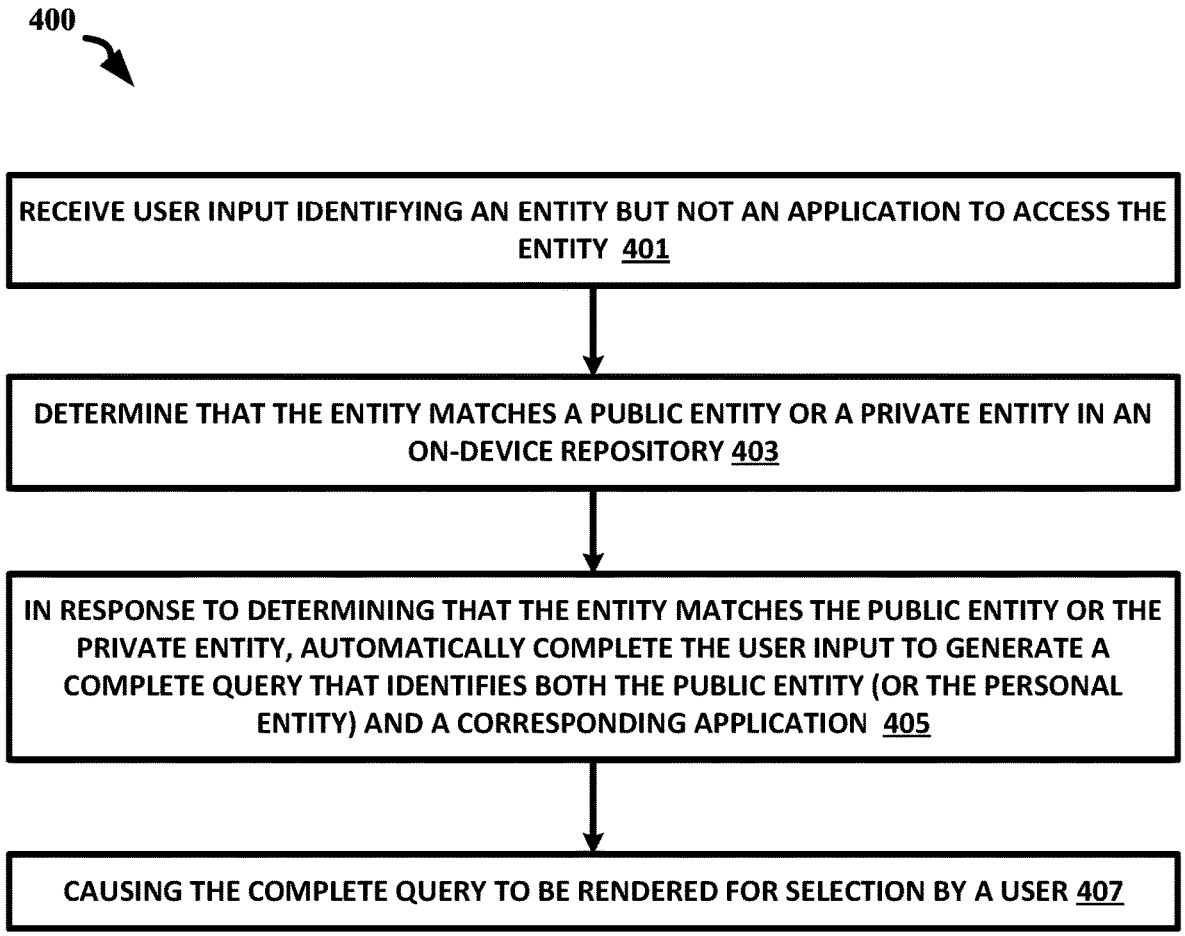
FIG. 4 illustrates another example method for implicit triggering, in accordance with various implementations.

FIG. 4 illustrates another example method for implicit triggering, in accordance with various implementations. For convenience, the operations of the method 400 are described with reference to a system that performs the operations. The system of method 400 includes one or more processors and/or other component(s) of a client device and/or of a server device. Moreover, while operations of the method 400 are shown in a particular order, this is not meant to be limiting. One or more operations may be reordered, omitted, or added.

Referring to FIG. 4, in various implementations, at block 401, the system can receive user input from a user that identifies an entity (e.g., content such as "credit card X") but not any application to access the entity.

In various implementations, at block 403, the system can determine whether the entity matches any public entity (or personal entity) stored in an on-device repository of a client device. The on-device repository can include a plurality of entries each storing an association between a public or personal entity with an explicit query identifying an action previously performed with respect to the public or personal entity within a corresponding application installed at the client device. Optionally, each of the plurality of entries can further include fulfillment information for fulfilling the action previously performed with respect to the public or personal entity within the corresponding application installed at the client device.

In various implementations, at block 405, the system can determine, in response to determining that the entity matches a public entity (or personal entity) within the on-device repository, automatically complete the user input to generate a complete query that identifies both the public entity (or the personal entity) and an application within which the public entity (or the personal entity) is present.

In various implementations, at block 407, the system can render the complete query to a user of the client device for the user to select or confirm the complete query.

In various implementations, the system can further receive additional user input that selects the complete query, and cause an action of the entity to be performed within the application in response to receiving the additional user input that selects the complete query. For example, in response to receiving the additional user input that selects the user query that identifies both the entity and the application, the system can cause the application to be launched and a search of the entity within the application to be performed.

Figure 5:
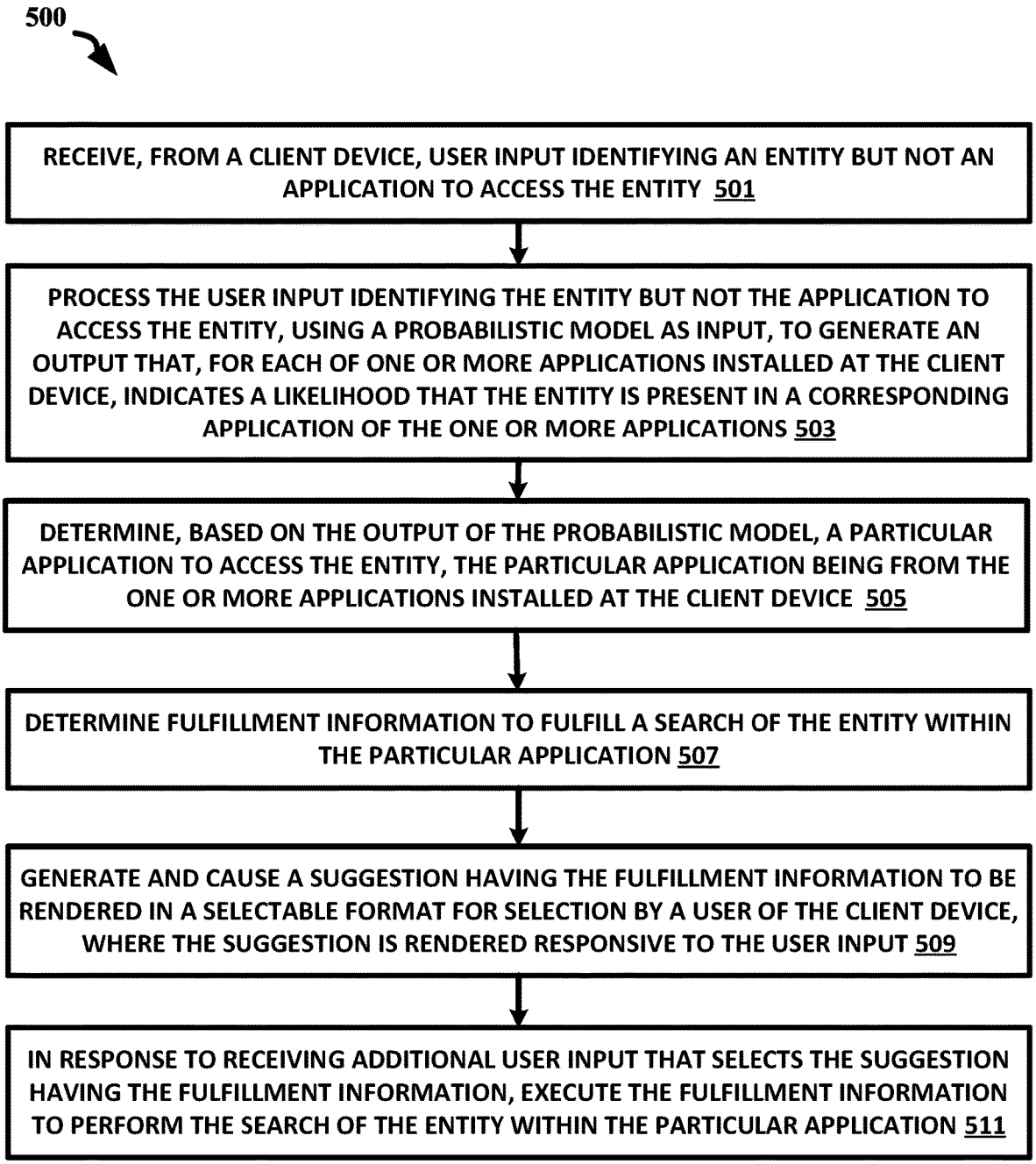
FIG. 5 illustrates a further example method for implicit triggering, in accordance with various implementations.

FIG. 5 illustrates a further example method for implicit triggering, in accordance with various implementations. For convenience, the operations of the method 500 are described with reference to a system that performs the operations. The system of method 500 includes one or more processors and/or other component(s) of a client device and/or of a server device. Moreover, while operations of the method 500 are shown in a particular order, this is not meant to be limiting. One or more operations may be reordered, omitted, or added.

Referring to FIG. 5, in various implementations, at block 501, the system can receive, via a client device, user input identifying an entity but not an application to access the entity. The user input can be received, for instance, via an on-device system (such as a unified search engine, an automated assistant, an operating system, etc.) of the client device. The user input, as non-limiting examples, can be a typed input (e.g., "song X" which includes an entity name "Song X" but does not include any information about which application is to be triggered to search for or play "song X"), or can be an audio input such as "Assistant, play song X" (same here, only entity name "song X" and no application or application name is identified to play "song X").

In various implementations, at block 503, the system can process the user input identifying the entity but not the application, using a probabilistic model as input, to generate an output. The output can, for each of one or more applications installed at the client device, indicate a likelihood (often in the form of a probability) that the entity is present in a corresponding application of the one or more applications that are installed at the client device. For example, given a typed input of "song X", the system can process such typed input, using a trained probabilistic model, to generate an output that includes a first probability for a first application, a second probability for a second application, and a third probability for a third application. The first probability for the first application can indicate the likelihood that the entity (e.g., "song X") is present within (or otherwise accessible via) the first application. The second probability for the second application can indicate the likelihood that the entity (e.g., "song X") is present within (or otherwise accessible via) the second application. The third probability for the third application can indicate the likelihood that the entity (e.g., "song X") is present within (or otherwise accessible via) the third application. It's noted that the first, second, and third applications here can be all applications, or a portion of all the applications installed at the client device.

In various implementations, at block 505, the system can determine, based on the output, a particular application to access the entity. Continuing with the "song X" example above, the first, second, and third probability can be, for instance, 0.7, 0.2, and 0.1, respectively. In this case, the first application (for which the first probability, i.e., 0.7, is predicted) can be determined as the particular application to access the entity of "song X" based on the first probability exceeding a predetermined threshold (which can be for instance 0.6) and/or being the top ranked probability when compared with other probabilities (e.g., 0.2 and 0.1) included in the output. In other words, in this example, the second or third application will not be determined as being suitable or being the particular application for accessing the entity "song X".

In various implementations, at block 507, the system can determine fulfillment information for fulfilling a search of the entity within the particular application. For example, the system can retrieve such fulfillment information from a historical query or action that is stored in an on-device repository to fulfill the search of the entity within the particular application. The fulfillment information can be, for instance, a deeplink or natural language intent that, when executed, causes the entity to be searched within the particular application.

In various implementations, at block 509, the system can generate and cause a suggestion embedded with the fulfillment information to be rendered in a selectable format (e.g., a selectable graphical user interface element), responsive to the user input, for selection by a user. Continuing with the "song X" example above, the suggestion can, for instance, include or display an identifier for the first application (which is determined as the particular application to access the entity "song X"), where the identifier can be a symbol representing the first application (and/or an application name of the first application) and displayed along with the user input of "song X" in a selectable manner. Alternatively, the suggestion can be selectable and include natural language content describing both the entity ("song X") and the particular application ("first application") that is determined to access the entity. For instance, the suggestion can be "search song X in the first application" displayed visually in a selectable manner.

In various implementations, at block 511, the system can, in response to receiving additional user input that selects the suggestion embedded with the fulfillment information, execute the fulfillment information to perform the search of the entity within the particular application. Continuing with the "song X" example above, in response to receiving a click or audio data that selects the suggestion (e.g., "search song X in the first application" or an icon of the first application displayed responsive to and/or along with the user input of "song X"), fulfillment information associated with or embedded in the suggestion can be executed. The execution of the fulfillment information results in the search of the entity to be performed within the particular application. Alternatively, the execution of the fulfillment information results in the particular application to be launched first and then the search of the entity to be performed within the particular application.

Figure 6:
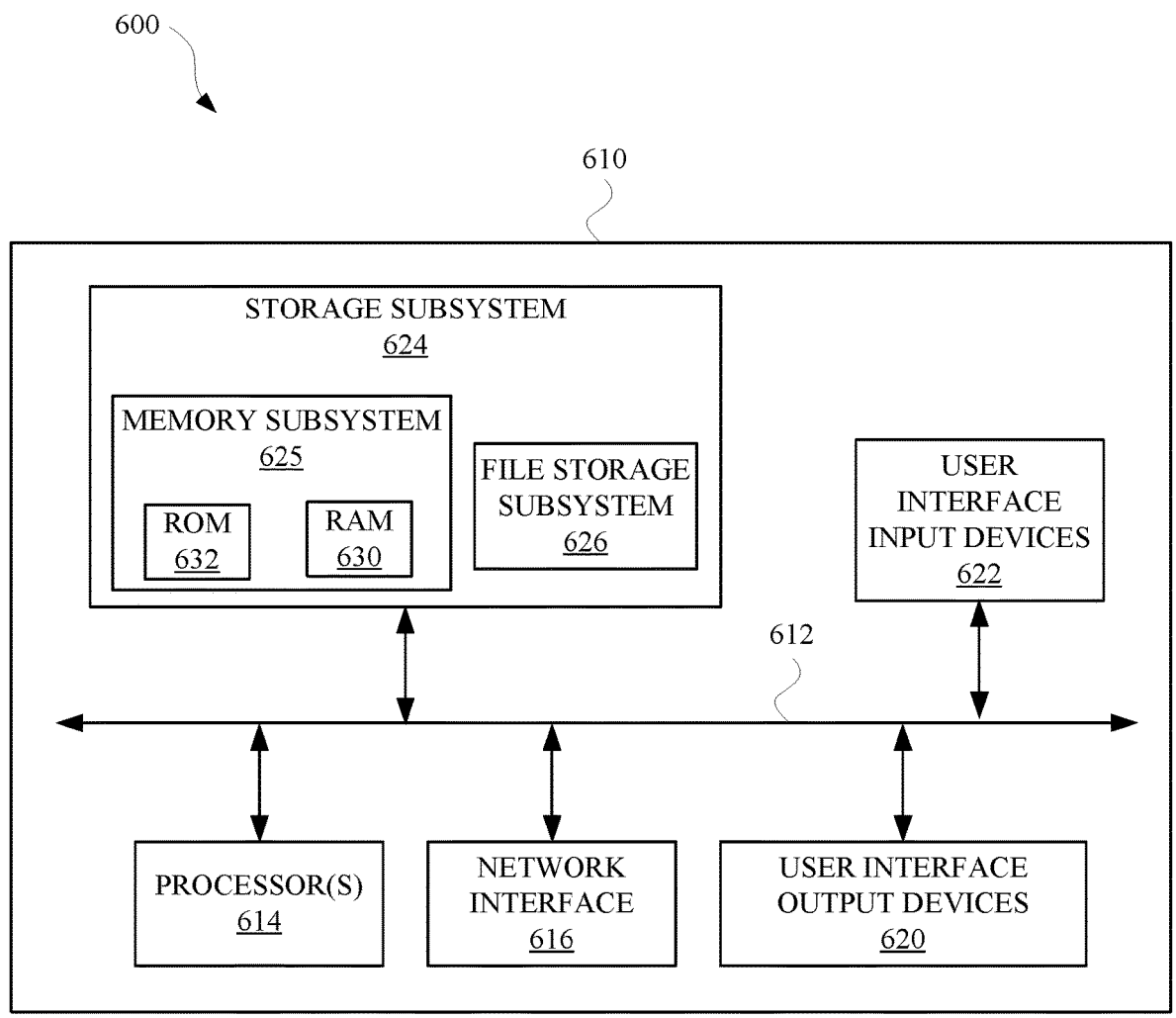
FIG. 6 illustrates an example architecture of a computing device, in accordance with various implementations.

FIG. 6 is a block diagram of an example computing device 610 that may optionally be utilized to perform one or more aspects of techniques described herein. In some implementations, one or more of a client computing device, cloud-based automated assistant component(s), and/or other component(s) may comprise one or more components of the example computing device 610.

Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform selected aspects of the methods disclosed herein, as well as to implement various components depicted in FIGS. 1 and 2.

These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem may use multiple buses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, and/or method described herein. In addition, any combination of two or more such features, systems, and/or methods, if such features, systems, and/or methods are not mutually inconsistent, is included within the scope of the present disclosure.

In various implementations, a computer-implemented method is provided, where the method includes: determining that an entity is associated with an application. In some implementations, determining that the entity is associated with the application can be based on identifying occurrences of one or more historical queries submitted via one or more corresponding computing devices. Each of the one or more historical queries can include an entity name and a corresponding application name. For instance, each of the one or more historical queries can include a corresponding entity name for the entity and a corresponding application name for the application.

In various implementations, the method can further include: determining fulfillment information for fulfilling a search of the entity within the application. In response to determining that the entity is associated with the application, the method can include: storing, at a user device, an association between the entity and the fulfillment information for fulfilling the search of the entity within the application. Subsequent to the storing, the method can include: receiving, via the user device, user input that indicates the entity but not the application; and in response to receiving the user input that indicates the entity but not the application, causing, based on the stored association between the entity and the fulfillment information, a suggestion to be rendered via the user device in a selectable format/manner. The suggestion can be in the selectable format that, when selected, executes the fulfillment information to fulfill the search (or another action) of the entity within the application.

In various implementations, the one or more historical queries include one or more queries submitted via the user device.

In various implementations, the method can further include: determining a count of the one or more historical queries that include the corresponding entity name and the corresponding application name; and determining that the count satisfies a privacy threshold. In some implementations, storing the association between the entity and the fulfillment information can be further in response to determining that the count satisfies the privacy threshold.

In various implementations, the one or more historical queries include at least one personal query submitted via the user device, and wherein storing the association between the entity and the fulfillment information is further in response to the at least one personal query having been submitted via the user device.

In various implementations, the fulfillment information includes a deeplink that, when executed, causes fulfillment of the search of the entity within the application. Alternatively or additionally, the fulfillment information includes a natural language intent, and one or more parameters for the intent, for fulfilling the search of the entity within the application. For instance, the natural language intent and the one or more parameters for the intent can be received by an automated assistant which causes the search of the entity to be performed within the application.

In various implementations, the association between the entity and the fulfillment information includes an association between one or more of the corresponding entity names, of the entity, and the fulfillment information. For instance, the entity (e.g., a movie) can correspond to different entity names (e.g., a movie name in English, a movie name in Korean, a name popular among audiences that refers to the movie, or a famous dialog or scene known from the movie, etc.). In these implementations, the user input can include any given entity name of the corresponding entity names of the entity.

In various implementations, determining that the entity is associated with the application comprises: processing, using a trained probabilistic model, the user input, to generate an output indicating a plurality of probabilities each representing a respective likelihood that the entity is present in one of a plurality of applications installed at the user device, and determining, based on the plurality of probabilities each representing the respective likelihood that the entity is present in one of a plurality of applications installed at the user device, that the entity is associated with the application.

In various implementations, another computer-implemented method is provided and includes: training a probabilistic model based one or more historical queries each including a respective entity name indicating a respective entity and a respective application name indicating a respective application; processing, using the trained probabilistic model, a name indicating an entity as input, to generate an output indicating at least one probability that indicates a likelihood that the entity is present in an application; and determining fulfillment information for fulfilling a search of the entity within the application. For example, as described previously in this disclosure, one or more entity files can be generated by processing the one or more historical queries using a Mapreduce system, where each of the plurality of entity files corresponds to an application. In other words, entities from the one or more historical queries can be processed and divided into different groups each being associated with a distinct application.

As a non-limiting example, a client device may be installed with (and assuming only within) a first application and a second application, and in response to determining that the client device is installed with the first application and the second application, an entity file for the first application can be downloaded and stored locally at the client device (if the first application is one of the applications that one or more of the historical queries mention), and an entity file for the second application can be downloaded and stored locally at the client device (if the second application is one of the applications that one or more of the historical queries mention). The entity file for the first application can include one or more public (or personal) entities present in the first application, a count of those public (or personal) entities present in the one or more historical queries, and/or one or more entity names for each of the one or more public (or personal) entities. Optionally or subsequently, the entity file for the first application can include, or be updated to include: fulfillment information associated with each of the one or more public) (or personal entities, where the fulfillment information for each pubic (or personal) entity enables one or more actions (search, display, etc.) with respect to the corresponding public (or personal) entity to be performed within the first application. Descriptions for the entity file for the second application are similar and thus repeated descriptions are not provided herein. The probabilistic model can be trained using the entity file for the first application and the entity file for the second application, to predict a first probability that a particular entity is accessible via the first application and/or a second probability that the particular entity is accessible via the second application. Based on the first and second probabilities, whether the entity is accessible via the first or second application can be determined.

In various implementations, in response to the likelihood satisfying a threshold, and in response to the application being installed at a computing device, the method can further include: storing, at the computing device, an association between the entity and the fulfillment information for fulfilling the search of the entity within the application.

Subsequent to the storing, the method can include: receiving, via the computing device, user input that indicates the entity but not the application; and in response to receiving the user input that indicates the entity but not the application: generating a suggestion corresponding to the fulfillment information for fulfilling the search of the entity within the application, and causing the suggestion to be rendered via the computing device in a selectable format. The suggestion can be in the selectable format and when selected, executes the fulfillment information to fulfill the search of the entity within the application.

In various implementations, the one or more historical queries are associated with multiple users, and the entity is a public entity having occurred in more than a predefined number of historical queries from the one or more historical queries that are associated with the multiple users.

In various implementations, the one or more historical queries include at least one personal query specific to a user of the computing device, and wherein the entity is a personal entity only shown in the personal query specific to the user.

In various implementations, the fulfillment information includes a deeplink that, when executed, fulfills the search of the entity within the application. In various implementations, the fulfillment information includes a natural language intent, and one or more parameters for the intent, for fulfilling the search of the entity within the application.

In various implementations, the one or more historical queries include at least one personal query submitted via a particular device, and wherein storing the association between the entity and the fulfillment information is further in response to the at least one personal query having been submitted via the particular device.

In various implementations, a system is provided and includes at least one processor and memory storing instructions that, when executed, cause the at least one processor to: determine that an entity is associated with an application, based on identifying occurrence of one or more historical queries submitted via one or more corresponding computing devices, wherein each of the one or more historical queries include a corresponding entity name for the entity and a corresponding application name for the application; determine fulfillment information for fulfilling a search of the entity within the application; and in response to determining that the entity is associated with the application, store, at a user device, an association between the entity and the fulfillment information for fulfilling the search of the entity within the application. Subsequent to the storing, the at least one processor can be configured to receive, via the user device, user input that indicates the entity but not the application; and in response to receiving the user input that indicates the entity but not the application, cause, based on the stored association between the entity and the fulfillment information, a suggestion to be rendered via the user device in a selectable format. The suggestion in the selectable format, when selected, executes the fulfillment information to fulfill the search of the entity within the application.

In various implementations, the corresponding application name for the application is an application nickname, an application name synonym, or an application type name. However, the corresponding application name is not limited herein, and can be in any other appropriate format used to identify or characterize the corresponding application.

In various implementations, the at least one processor is further configured to determine a count of the one or more historical queries that include the corresponding entity name and the corresponding application name; and determine that the count satisfies a privacy threshold. The association between the entity and the fulfillment information can be stored further in response to determining that the count satisfies the privacy threshold.

In various implementations, the fulfillment information includes a deeplink that, when executed, causes fulfillment of the search of the entity within the application. Alternatively or additionally, the fulfillment information includes a natural language intent and one or more parameters for the intent, that causes an automated assistant to fulfill the search of the entity within the application.

In various implementations, the entity corresponds to one or more corresponding entity names, and wherein the association between the entity and the fulfillment information includes an association between one or more of the corresponding entity names, of the entity, and the fulfillment information.

Figure 7:
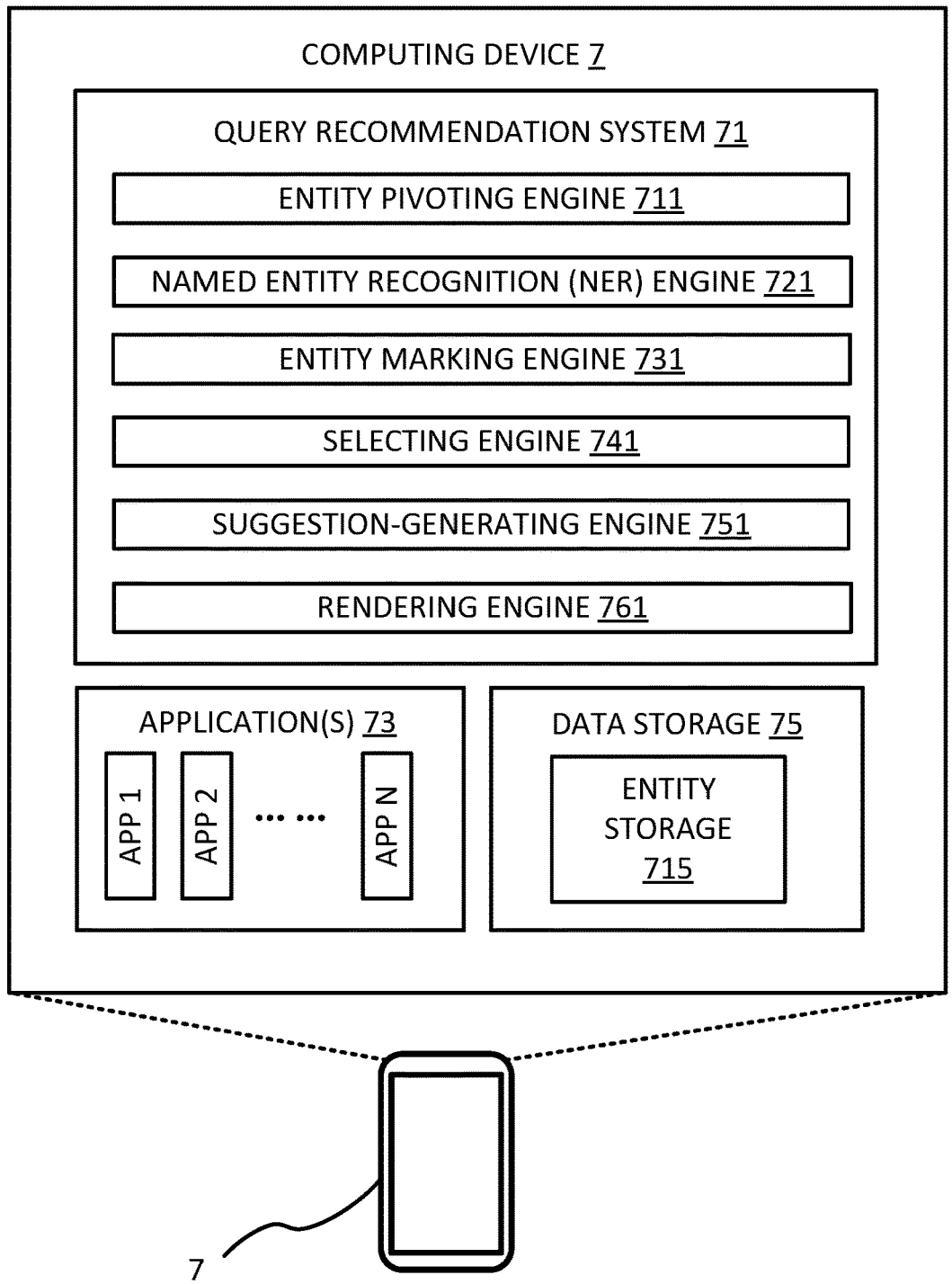
FIG. 7 depicts a block diagram of another example environment that demonstrates various aspects of the present disclosure, and in which implementations disclosed herein may be implemented.

In various implementations, FIG. 7 depicts a block diagram of an example environment 700 that demonstrates various aspects of the present disclosure. As shown in FIG. 7, the example environment 700 can include a computing device 7. The computing device 7 can include a query recommendation system 71, where the query recommendation system 71 can include an entity pivoting engine 711, a named entity recognition (NER) engine 721, an entity marking engine 731, a selecting engine 741, a suggestion-generating engine 751, and/or a rendering engine 761. The computing device 7 can be installed with one or more applications 73. For instance, the one or more applications 73 can include App1, App 2, . . . , and App N, where N is a positive integer greater than or equal to 1. The computing device 7 can include a data storage 75, where the data storage 75 can include an entity storage 715 (also referred to as "entity database").

The entity storage 715, for instance, can be a personal entity database for a user of the computing device 7. The personal entity database can store personal entities that are determined, e.g., based on historical queries donated by the one or more applications (App1, App 2, . . . , and App N) installed at (or otherwise accessible via) the computing device 7. The historical queries can be previously received from the user of the computing device 7. Alternatively or additionally, the personal entities in the personal entity database can be donated directly by the one or more applications (App1, App 2, . . . , and App N). The personal entities can include, but are not limited to include, payment cards (e.g., a card ending with 5418) accessible and donated by a wallet application, one or more files (e.g., an image captured by a user and saved in a personal folder) within folders accessible and donated by one or more applications, alarm(s) or timer(s) accessible and donated by a Clock application, open tab(s) and bookmark(s) accessible and donated by a browser application, note(s) and list(s) accessible and donated by a note application, save collection(s) accessible and donated by an information-saving application, subscribed channel(s) accessible or donated by a media player application, event(s) accessible and donated by a calendar application.

In some implementations, metadata of the personal entities can be stored in association with the personal entities in the personal entity database. The metadata for a personal entity can include, but is not limited to, an application providing access to the personal entity, an application action performed via the application with respect to the personal entity, fulfillment information for fulfilling the application action, and/or other information such as a thumbnail associated with the personal entity or the application. The metadata for a personal entity can be determined based on historical data associated with one or more historical queries containing the personal entity, or can be determined based on contextual data for the personal entity from a corresponding application. The historical data and/or the contextual data, for instance, can include a natural language understanding (NLU) intent and one or more parameters previously determined for a historical query that contains the personal entity, a deeplink that was previously generated and that includes the NLU intent and the one or more parameters for fulfilling an action responsive to the historical query via an application, and/or other information (e.g., an image representation of the application) associated with fulfilling the action.

In some implementations, the data storage 75 can include more than one personal entity database. For instance, the computing device 7 may be registered with different users (e.g., a first user and a second user). In this case, the data storage 75 may include a first personal entity database specific to the first user and a second personal entity database specific to the second user. The first (or second) personal entity database can include, for instance, a plurality of entries each identifying a personal entity determined based on processing one or more historical queries donated by application(s) in association with the first (or second) user. An entry for a personal entity in the first (or second) personal entity database can additionally include metadata associated with the personal entity, where the metadata can include an application that provides access to the personal entity, an application action performed in association with the persona entity, a frequency of the first (or second) user that accesses the personal entity, etc.

In some implementations, additionally or alternatively, the data storage 75 can include a public entity database storing a plurality of entries each containing a public entity associated with multiple users (e.g., previously interacted with by the multiple users). The plurality of entries in the public entity database can include, for instance, a first entry identifying a first public entity (e.g., "SFO") and metadata associated with the first public entity, and/or a second entry identifying a second public entity (e.g., "Christmas tree") and metadata associated with the first public entity.

In some implementations, the personal entity storage can be a nosql database (e.g., AppSearch, RDBMS such as sqlite3). Additionally or alternatively, in some implementations, the public entity storage can be a nosql database.

In some implementations, each of the one or more applications (App1, App2, . . . , or App N) can include an application entity storage storing entities accessed by user(s) within the corresponding application, where the application entity storage can be a binary large object (BLOB) storage. The BLOB storage can include metadata associated with one or more of the entities accessible within an application. In some implementations, the one or more applications (App1, App2, . . . , or App N) can share an application entity storage and respectively donate entities to the application entity storage.

In various implementations, the NER engine 721 can determine, given a stream of text, one or more entities (e.g., "SFO", "folder named 'summertime'", etc.) from the stream of text. The NER engine 721 can additionally determine a type (e.g., person, location, or organization) for each of the entities determined from the stream of text. In some implementations, the NER engine 721 can process a user input to extract and/or classify an entity from the user input. For instance, the query recommendation system 71 can receive a user input not specifying any application (e.g., a typed input of "SFO"), and the NER engine 721 can process the typed input of "SFO" to extract an entity of "SFO", and/or classify such entity with a label or type of "location"). In some implementations, the NER engine 721 can determine more than one entity for the user input that specifies no application. For example, in response to receiving a user input of "SF", the NER engine 721 can determine multiple entities such as a first entity of "San Francisco" and a second entity of "SFO", that both correspond to the user input of "SF". In this example, the NER engine 721 can further determine an entity type for each of the multiple entities (e.g., an entity type of "city" for the first entity of "San Francisco" and an entity type of "airport" or "location" for the second entity of "SFO"). Alternatively or additionally, the NER engine 721 can rank the multiple entities and determine a ranking score for each of the multiple entities (e.g., a first ranking score for the first entity of "San Francisco", and a second ranking score for the second entity of "SFO").

In various implementations, given an entity (or each of the multiple entities), the entity pivoting engine 711 can determine one or more applications (or one or more application actions) associated with the entity. In some implementations, the entity pivoting engine 711 can determine the one or more applications (or the one or more application actions) based on entity information (e.g., an entity type) of the entity. For example, the entity pivoting engine 711 can determine that a first ridesharing application, a second ridesharing application, and a navigation application are associated with the entity of "SFO", based on an entity type (e.g., location) of the entity "SFO". In some implementations, alternatively or additionally, the aforementioned historical queries, entity files, and/or entity databases can be utilized to determine the one or more applications (or app actions) that are associated with the entity. In various implementations, optionally, the selecting engine 741 can select a subset of the one or more applications (that are determined by the entity pivoting engine 711), for recommendation to a user of the computing device 7. In some implementations, the selecting engine 741 can include a ranking engine that ranks the one or more applications determined by the entity pivoting engine 711. The ranking engine can rank the one or more applications, for instance, based at least in part on the aforementioned ranking scores generated using the NER engine 721.

In some implementations, the selecting engine 741 can include a filtering engine (not illustrated) to remove at least one application (e.g., having an unavailable status, or is duplicated) from the one or more applications, so that the removed application (or an action performable via this removed application) is not recommended to a user of the computing device 7. For instance, the filtering engine can remove the first ridesharing application from the applications that include the first ridesharing application, the second ridesharing application, and the navigation application, based on the first ridesharing application haven't been used for a certain period of time (e.g., six months).

In various implementations, given an entity, the suggestion-generating engine 751 can generate one or more suggestions based on one or more selected applications. The one or more suggestions generated by the suggestion-generating engine 751 can be rendered, for instance, by the rendering engine 761. As a non-limiting example, if the one or more selected applications include the second ridesharing application and the navigation application, the suggestion-generating engine 751 can generate a first suggestion that corresponds to the second ridesharing application and a second suggestion that corresponds to the navigation application. The first suggestion can be a selectable element identifying the second ridesharing application (e.g., displaying an icon or name representing the second ridesharing application), where the selectable element when selected, causes the second ridesharing application to be launched/opened. The second ridesharing application can be launched/opened in a state where an input field for destination is filled with "SFO" from the user query. The second suggestion can be a selectable element identifying the navigation application (e.g., displaying an icon or name representing the navigation application), where the selectable element when selected, causes the navigation application to be launched/opened. The navigation application can be launched/opened in a state where an input field for destination is filled with "SFO" from the user query.

In some implementations, as described above, the NER engine 721 may determine more than one entity ("multiple entities") based on a user input that is received via a user input device (e.g., keyboard, microphone, touch screen, etc.) of the computing device 7. The NER engine 721 may further determine an entity name for each of the multiple entities, an entity type for each of the multiple entities, and/or a ranking score for each of the multiple entities. In some implementations, for the multiple entities determined (e.g., using the NER engine 721) based on the user input, applications (or application actions) corresponding to the multiple entities can be determined using the entity pivoting engine 711. One or more of the applications (or application actions) can be selected using the selecting engine 741, and suggestions recommending/suggesting the one or more selected application (or application actions) can be generated using the suggestion-generating engine 751 and rendered in response to the user input using the rendering engine 761.

In some implementations, the entity marking engine 731 can be applied to determine whether a single-word query (or any of the multiple entities determined by the NER engine 721) matches a personal entity that is specific to a user that provides the user input. In response to determining that the single-word query (or any of the multiple entities determined by the NER engine 721) matches a particular personal entity, the entity marking engine 731 can mark the single-word query and/or the particular entity (e.g., for boosted suggestion). The entity marking engine 731 can, for instance, determine whether any of the multiple entities determined by the NER engine 721 matches a personal entity based on matching scores determined for the multiple entities. In this case, if a matching score determined for a particular entity of the multiple entities satisfies a matching threshold, the entity marking engine 731 can determine that the particular entity of the multiple entities matches a personal entity and therefore mark the particular entity (e.g., for boosted suggestion of an application or an application action that is associated with the particular entity).

In some implementations, alternatively, the entity marking engine 731 can be applied to determine whether any of the multiple entities determined by the NER engine 721 matches a personal entity (specific to a user that provides the user input) or a public entity previously accessed by the user (and/or a number of times the public entity has been accessed by the user). In this case, the entity marking engine 731 can mark an entity determined as a personal entity in a first manner (e.g., with a first label indicating strongest recommendation), and mark an entity determined as a public entity previously accessed by the user in a second manner (e.g., with a second label indicating moderate recommendation).

Alternatively, the entity marking engine 731 can be applied to determine whether any of the multiple entities determined by the NER engine 721 is a personal entity specific to a user that provides the user input, a public entity previously accessed by the user (and a number of times the public entity has been accessed by the user), or an entity never interacted with by the user. In this case, the entity marking engine 731 can mark an entity determined as a personal entity in a first manner (e.g., with a first label indicating strongest recommendation), and mark an entity determined as a public entity previously accessed by the user in a second manner (e.g., with a second label indicating moderate recommendation). The entity marking engine 731 can mark the entity never interacted with by the user in a third manner (e.g., with a third label indicating weak recommendation or "not recommended"), or may choose to not mark the entity (that is never interacted with by the user). It is noted that the way the entity marking engine 731 marks entities is not limited to descriptions herein.

The existence and/or types of the aforementioned labels (the first, second, and/or third labels) can be applied to modify the ranking and/or selecting of the application(s) or application action(s) for recommendation to a user that provides the user input. For example, a suggestion recommending an application to access a personal entity (e.g., marked with the first label) can be boosted with respect to a suggestion recommending an application to access a public entity interacted with by the user for only once. As another example, an application for accessing an entity that is never interacted with by the user (who provides the user input) can be removed by the selecting engine 741 when selecting application(s) or application action(s) for recommendation/ suggestion responsive to the user input. This way, the number of suggestions to be rendered in response to the user input can be reduced, thereby reducing the computational resources involved in generating and rendering suggestion(s) responsive to the user input.

Figure 8A:
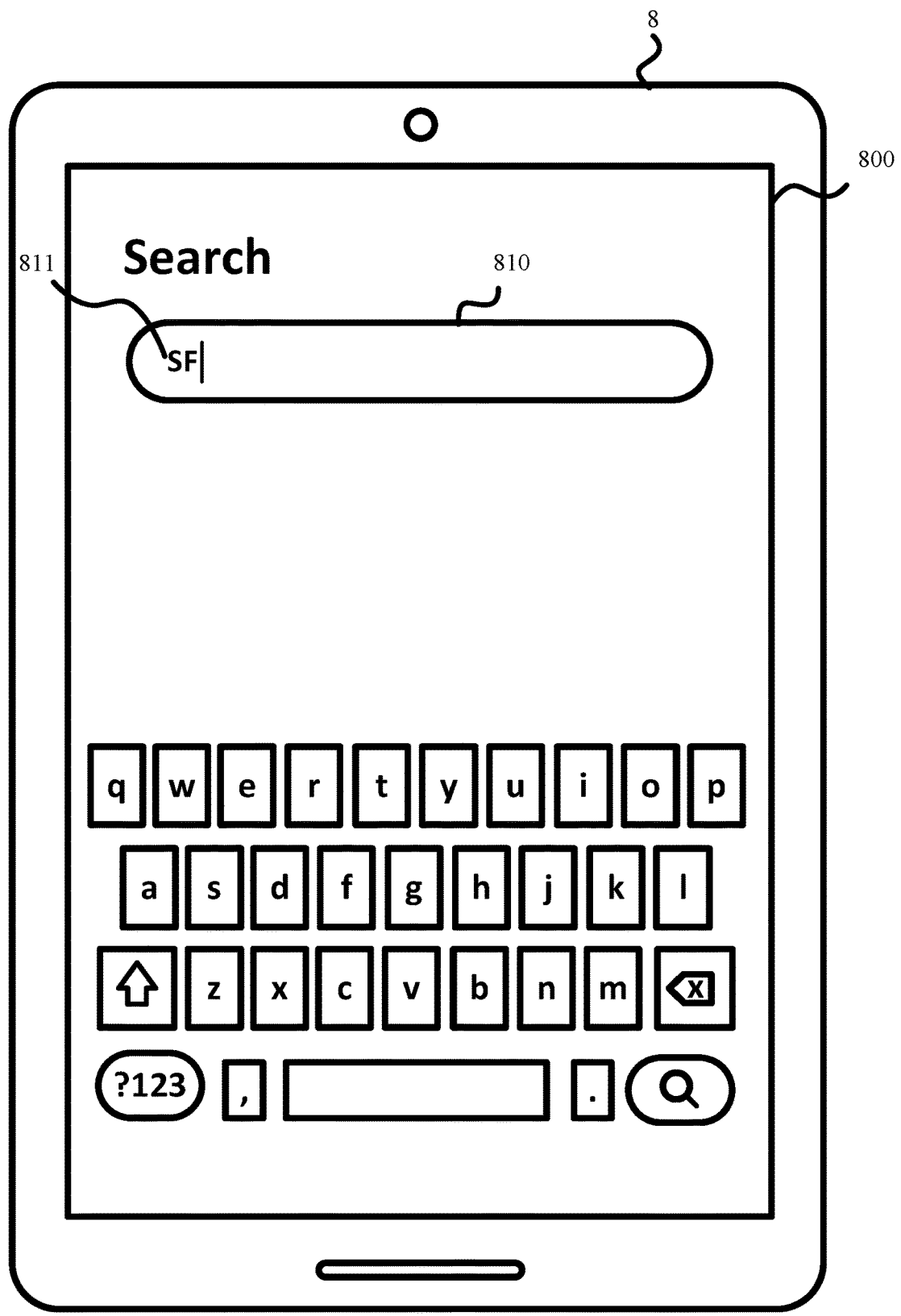
FIG. 8A depicts an example user interface showing a user query received via a search system that demonstrates various aspects of the present disclosure, and in which implementations disclosed herein may be implemented.
Figure 8B:
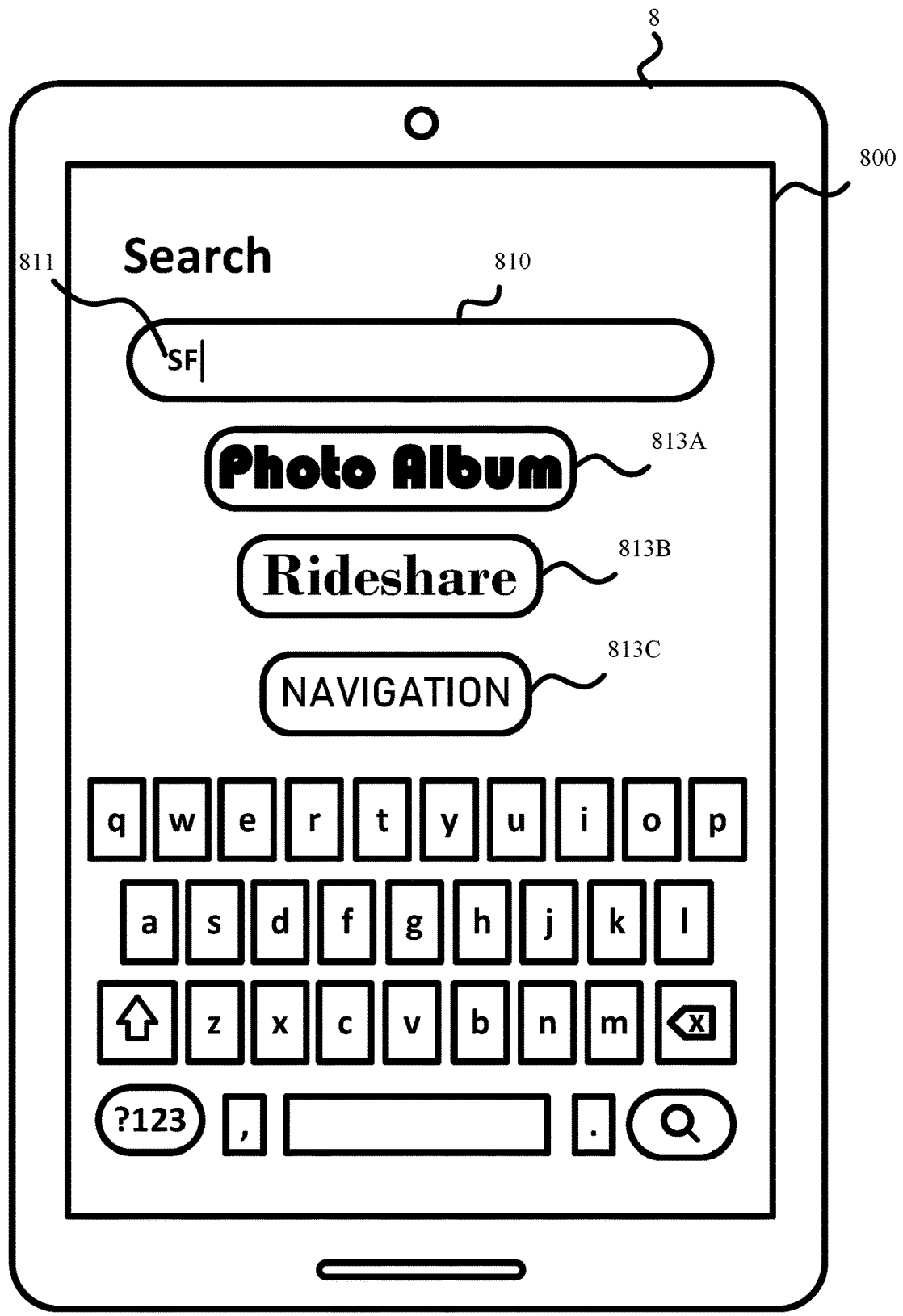
FIG. 8B depicts an example user interface showing suggestions responsive to the user query in FIG. 8A.
Figure 8C:
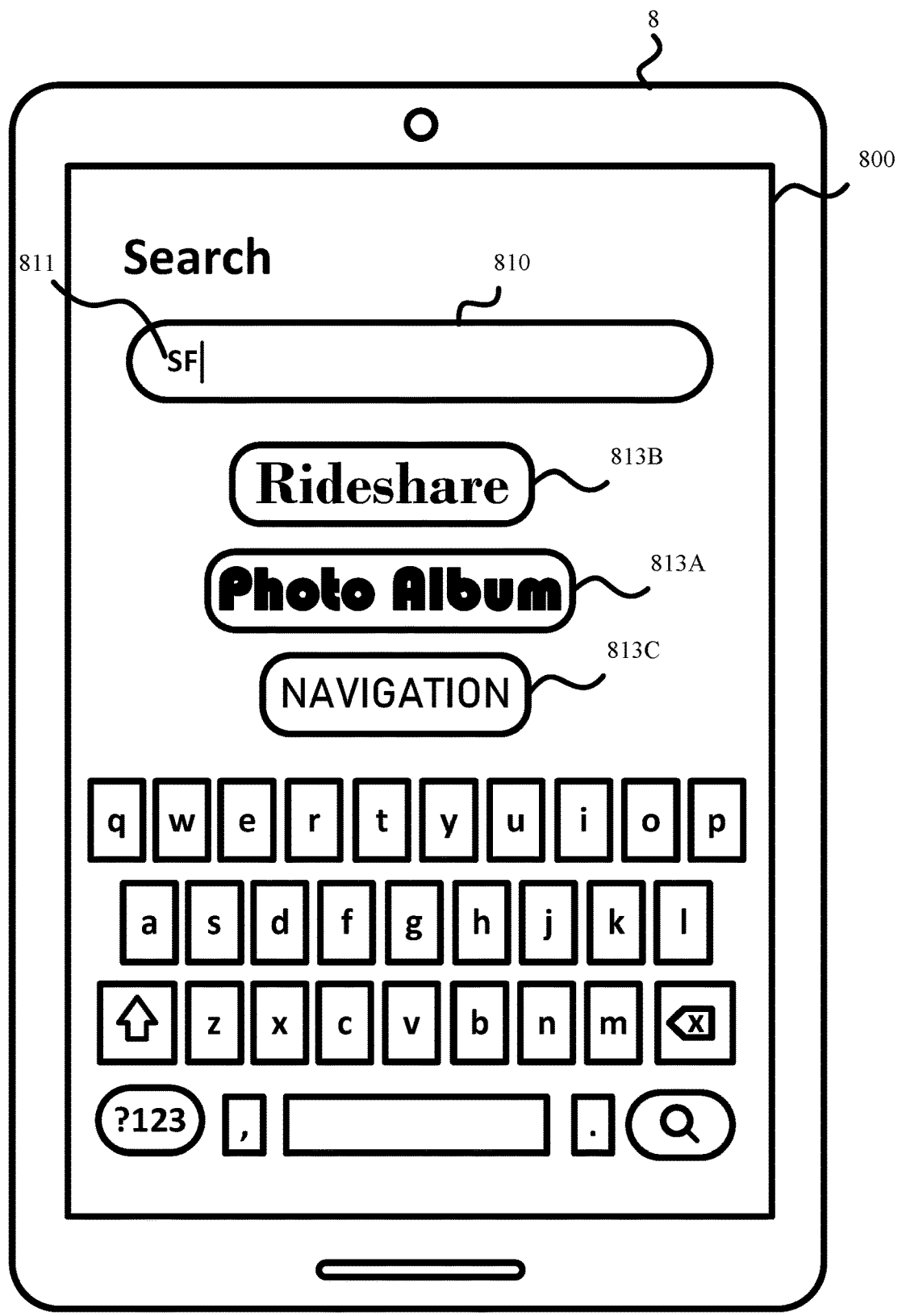
FIG. 8C depicts another example user interface showing suggestions responsive to the user query in FIG. 8A.
Figure 8D:
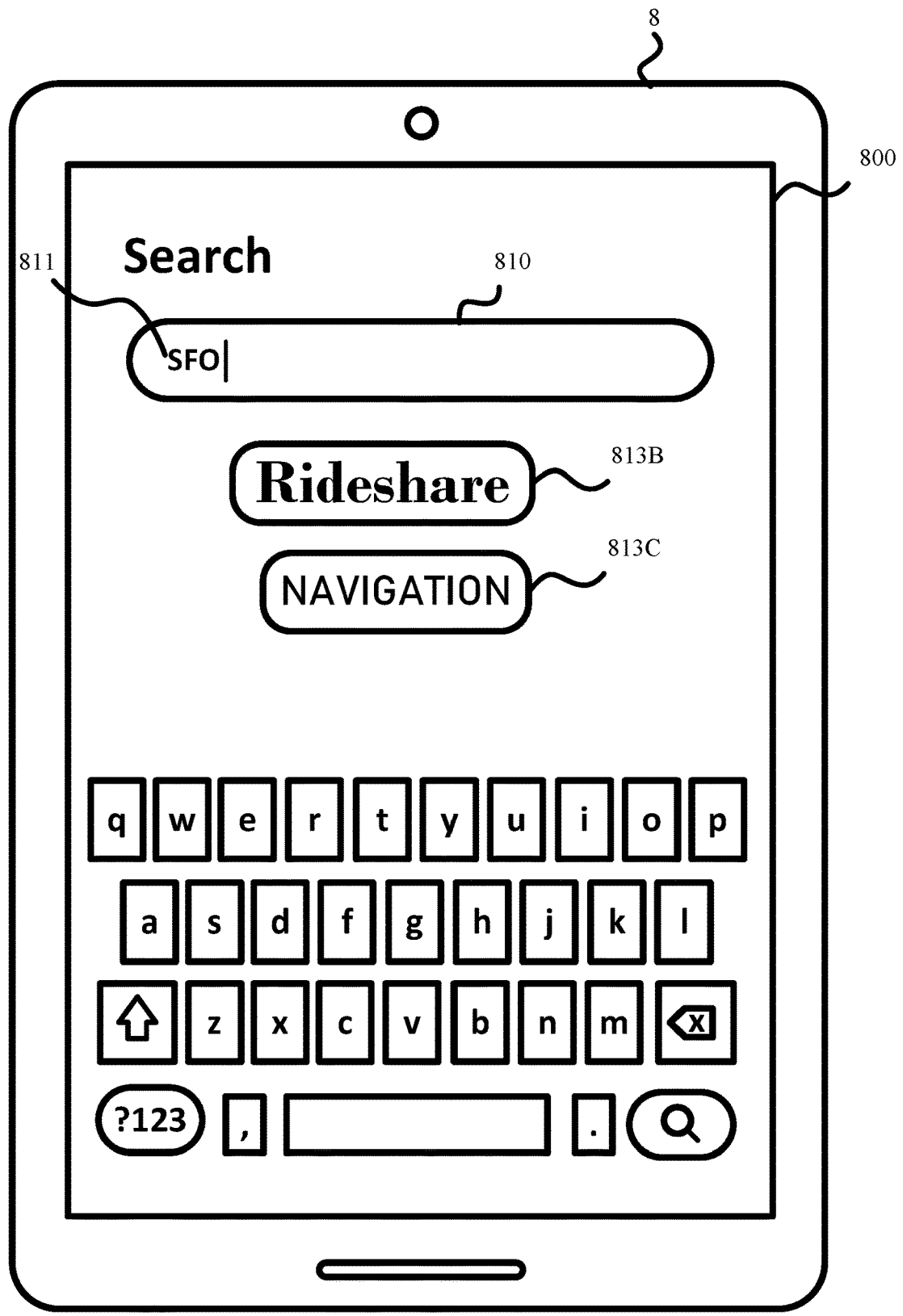
FIG. 8D depicts another example user interface showing suggestions responsive to additional user input that modifies the user query in FIG. 8A.
Figure 8E:
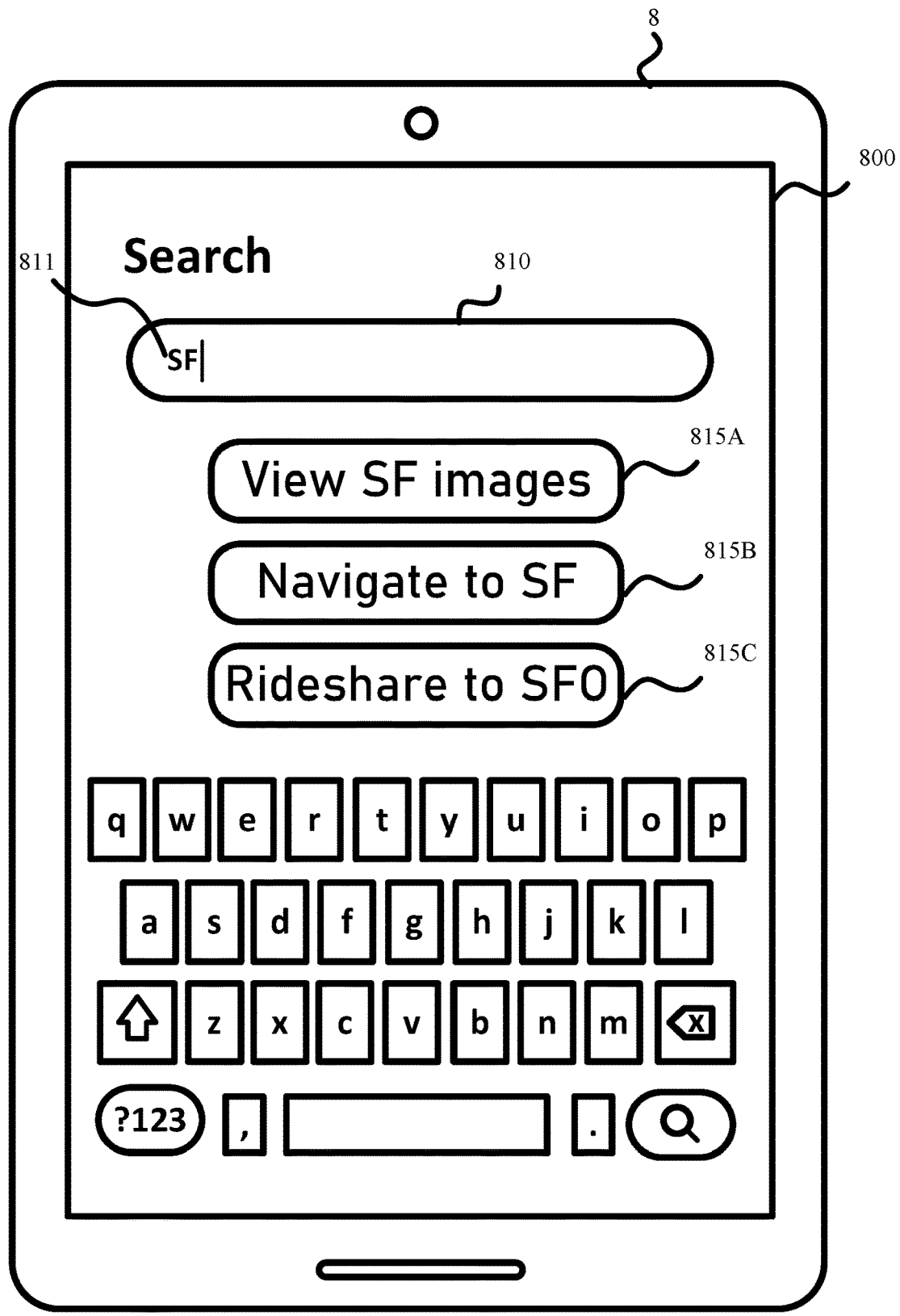
FIG. 8E depicts another example user interface showing suggestions responsive to the user query in FIG. 8A.

FIG. 8A depicts a first non-limiting example user interface receiving a user query, which demonstrates various aspects of the present disclosure, and in which implementations disclosed herein may be implemented. The user interface can be a search interface, such as a unified search interface that enables search and/or access of entities within different applications (e.g., all available applications) installed at (or accessible via) a client device. FIG. 8B depicts a second non-limiting example user interface showing suggestions responsive to the user query in FIG. 8A. FIG. 8C depicts a third non-limiting example user interface showing suggestions responsive to the user query in FIG. 8A. FIG. 8D depicts a fourth non-limiting example user interface showing suggestions responsive to the user query in FIG. 8A. FIG. 8E depicts a fifth non-limiting example user interface showing suggestions responsive to the user query in FIG. 8A.

As shown in FIG. 8A, a user can type in a word 811 (e.g., "SF") in a search field 810 of a user interface 800 of a client device 8. Based on the typed input 811 of "SF", a first entity of "SF" and a second entity of "SFO" can be determined (e.g., using the aforementioned NER engine 721 in FIG. 7). Optionally, the first entity of "SF" can have a first recognition score (sometimes referred to as "entity ranking score") that is higher than a second recognition score for the second entity of "SFO". The first recognition score for "SF" can be higher than the second recognition score of "SFO" based on the first entity of "SF" matches exactly as the typed input 811 of "SF" and/or based on other recognition factors (e.g., frequencies of a plurality of users associating "SF" or "SFO" with input of "SF"). It is noted that, if the user continued typing by adding an additional letter "O" to the typed input 811 of "SF", a different set of entities (that are different from the first and second entities) can be determined. For instance, the different set of entities recognized from an updated typed input of "SFO" can include an entity of "SFO" and an additional entity of "SFO museum", where the entity of "SFO" may have a higher recognition score than the additional entity of "SFO museum".

Based on the first entity and the second entity, a plurality of applications (or application actions) can be derived (e.g., using the entity pivoting engine 711 in FIG. 7). For instance, a first application of "photo album" that corresponds to the first entity "SF", a second application of "rideshare" that corresponds to the first entity of "SF", and a third application of "navigation" that corresponds to the second entity of "SFO" can be determined. A suggestion can be generated for each of the first application, the second application, and the third application, to be rendered at the user interface 800 of the client device 8 as a response to the typed input 811.

For instance, referring to FIG. 8B, in response to receiving the typed input 811 (e.g., "SF") in the search field 810, a first suggestion 813A (e.g., suggesting a first application of "photo album"), a second suggestion 813B (e.g., suggesting a second application of "rideshare"), and a third suggestion 813C (e.g., suggesting a third application of "navigation") can be rendered at the user interface 800. The first, second, and third suggestions can be rendered with respect to the typed input 811. The first suggestion 813A can be rendered visually as a first selectable element that, when selected, causes the first application of "photo album" to be launched or opened. The second suggestion 813B can be rendered visually as a second selectable element that, when selected, causes the second application of "rideshare" to be launched or opened. The third suggestion 813C can be rendered visually as a third selectable element that, when selected, causes the second application of "navigation" to be launched or opened.

Optionally, the first selectable element 813A, when selected, can cause a user interface of the first application of "photo album" to be rendered. The user interface of the first application of "photo album" can include, for instance, a folder collecting images from the Internet that capture popular shops and/or destinations within the city of San Francisco ("SF"). The second selectable element 813B, when selected, can cause a user interface of the second application of "rideshare" to be rendered, where the user interface of the second application of "rideshare" includes a text field of "destination" filled with "SF" (which is extracted from the typed input 811). The third selectable element 813C, when selected, can cause a user interface of the third application of "navigation" to be rendered, where the user interface of the third application of "navigation" includes a text field of "destination" filled with "SFO" (which is extracted from the typed input 811).

In some implementations, the first, second, and third applications can be ranked based on ranking scores, where the ranking score for each of the first to third application can be determined based on the first recognition score (or the second recognition score), and/or based on other influential factors (e.g., the usage frequency of each of the applications, time that an application was last accessed or modified, etc.). It is noted that different scores and/or factors can be assigned different weights. For example, based on the third application of "navigation" being used by the user (who provides the typed input) much more frequently than the second application of "rideshare" and based on the first recognition score for the first entity of "SF" being higher than the second recognition score of the second entity of "SFO" and based on the recognition score is given a higher weight than the usage frequency factor, the first application can have a first ranking score higher than a third ranking score of the third application, and the third ranking score of the third application can be higher than a second ranking score of the second application.

In the above example, the first, second, and third applications may be ranked in the following ranking order: the first application of "photo album", the third application of "navigation", and the second application of "rideshare". In this case, the first selectable element 813A for the first application of "photo album", the second selectable element 813B for the second application of "rideshare", and the third selectable element 813C for the third application of "navigation" can be rendered at the user interface 800 based on the ranking order of the first application of "photo album"→the third application of "navigation"→the second application of "rideshare". Referring to FIG. 8C, the first selectable element 813A for the first application of "photo album" can be rendered at a location closest to the typed input 811, the third selectable element 813C for the third application of "navigation" can be rendered below the first selectable element 813A, and the second selectable element 813B for the second application of "rideshare" can be rendered below the third selectable element 813C. The specific manner that the first to third application is rendered are not limited thereto, and can be any applicable manner that reflects the ranking order.

In some implementations, the ranking order can be modified based on identification of a personal entity (if any) from the entities determined by the NER engine 721 (in FIG. 7) based on the typed input 811. In some implementations, the personal entity can be identified by utilizing a personal entity database (e.g., as described previously). For instance, given the first entity of "SF" and the second entity of "SFO" determined based on the typed input of "SF", the personal entity database storing a plurality of personal entities can be searched using the first entity of "SF" and the second entity of "SFO", respectively. If, for instance, a search of the personal entity database using the first entity of "SF" results in a search result indicating a match between a personal entity of "XX Orange St, SF, 94080" to the first entity of "SF", where the personal entity of "XX Orange St, SF" is stored in the personal entity database in association with the second application of "rideshare". In this case, the ranking order can be modified from "first application of 'photo album'→the third application of 'navigation'→the second application of 'rideshare'" to "the second application of 'rideshare'→the first application of 'photo album'→the third application of 'navigation'", as shown in FIG. 8C. In other words, a suggestion that suggests an application that corresponds to a personal entity that matches (or corresponds to) an entity determined from the typed input 811 can be boosted and given rendering priority over other applications.

In some implementations, referring to FIG. 8D, if an additional user input that modifies/updates the typed input 811 of "SF" (which is a single-word query/input) into a new word, such as "SFO", suggestion(s) for a different set of applications can be generated and rendered in response to receiving the additional user input. The different set of applications suggested for accessing the updated typed input (e.g., "SFO") can, for instance, include a subset of applications (e.g., the rideshare application and the navigation application) from the plurality of applications (e.g., the rideshare application, the photo album, the navigation application) that are suggested in response to the typed input 811.

The different set of applications suggested for accessing the updated typed input (e.g., "SFO") can also include an application not from the plurality of applications (e.g., the rideshare application, the photo album, the navigation application) that are suggested in response to the typed input 811, or may not include any application from the plurality of applications. Determining applications from a user query that identifies no application can be similar to descriptions provided above. For instance, the applications can be selected and filtered based on entity information (e.g., entity type) of entities that are derived from the user query that identifies no application, and/or an application for accessing a derived entity that matches a personal entity in the personal entity database for the user can be boosted for suggestion/recommendation.

In some implementations, referring to FIG. 8E, instead of the first application suggestion 813A suggesting the first application of "photo album", the second application suggestion 813B suggesting the second application of "rideshare", and the third application suggestion 813C, a first app action suggestion 815A, a second app action suggestion 815B, and a third app action suggestion 815C can be selected and/or rendered within the user interface 800 in response to the typed input 811 (e.g., "SF"). The first app action suggestion 815A can suggest a first app action of "view SF images", the second app action suggestion 815B can suggest a second app action of "rideshare to SF", and the third app action suggestion 815C can suggest a third app action of "navigate to SFO". Optionally, each app action suggestion can identify an application using which an application action can be performed. For instance, while not illustrated, the first app action suggestion 815A can suggest an action of "view SF images", in association with the first application of "photo album".

Optionally, the first app action suggestion 815A can be embedded with a first link (e.g., a deeplink) that, when the first app action suggestion 815A is selected, causes a photo album application to be opened in a state where a user interface of the photo album application shows or indicates a folder collecting public images for the city of SF. The second app action suggestion 815B can be embedded with a second link that, when the second app action suggestion 815B is selected, causes a rideshare application to be opened in a state where a user interface of the rideshare application includes a destination field filled with the typed input of "SF" (or filled with "XX Orange St, 94080" if the personal entity database is searched and the personal entity of "XX Orange St, SF, 94080" is returned as search result that is corresponding or responsive to the first entity of "SF"). The third app action suggestion 815C can be embedded with a third link that, when the third app action suggestion 815C is selected, causes a navigation application to be opened in a state where a user interface of the navigation application includes a destination field filled with the typed input of "SFO".

The first link, for instance, can be a URL link that includes parameter values (for one or more parameters) derived from entity information of the entity of "SF". The parameter values, for instance, can include a folder name and/or a folder address for the folder that collects the public images for the city of SF.

Figure 8F:
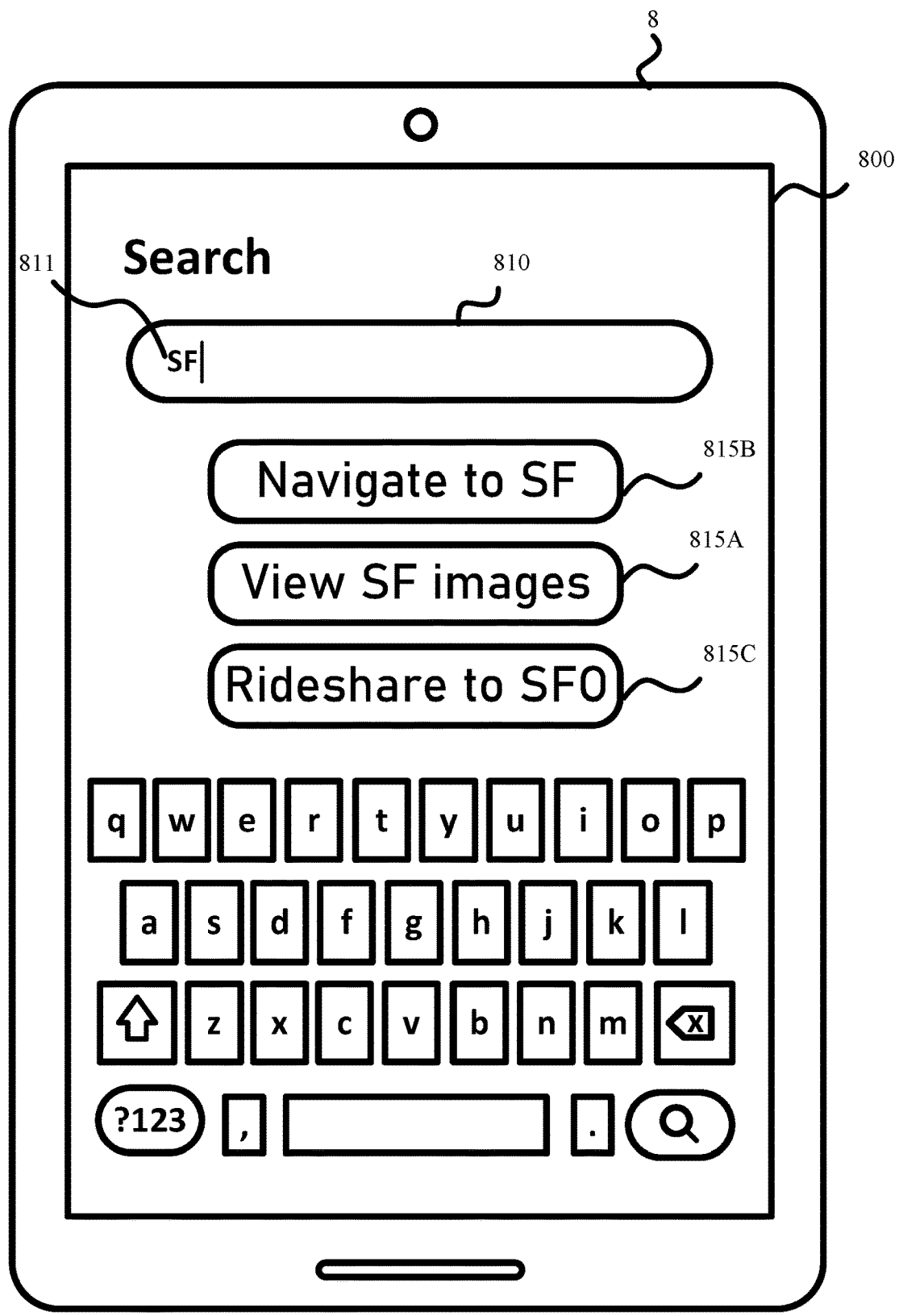
FIG. 8F depicts another example user interface showing suggestions responsive to the user query in FIG. 8A.

Referring to FIG. 8F, in some implementations, if an entity marking process is applied, the second app action suggestion 815B can be boosted for rendering based on the first entity of "SF" matches the personal entity of "XX Orange St, SF, 94080" which is accessible via the second application of "rideshare". In these implementations, different from FIG. 8E, the second app action suggestion 815B can be rendered prior to the rendering of other suggestions (e.g., the first app action suggestion 815A and the third app action suggestion 815C). In some other implementations, the first, second, and third app action suggestions 815A–C can be rendered in a list, for instance, the second app action suggestion 815B can be rendered closer to the typed input 811 than the first app action suggestion 815A and the third app action suggestion 815C.

Optionally, in some implementations, if an additional user input that modifies/updates the typed input 811 of "SF" (which is a single-word query/input) into a new word, such as "SFO", suggestion(s) for a different set of application actions can be generated and rendered in response to receiving the additional user input. The different set of application actions suggested for accessing the updated typed input (e.g., "SFO") can, for instance, include a subset of application actions from the plurality of application actions that are suggested in response to the typed input 811. The different set of application actions suggested for accessing the updated typed input (e.g., "SFO") can also include an application action not from the plurality of application actions that are suggested in response to the typed input 811, or may not include any application action from the plurality of applications. Determining application actions from a user query that identifies no application can be similar to descriptions provided above. For instance, the application actions can be selected and filtered based on entity information (e.g., entity type) of entities that are derived from the user query that identifies no application, and/or an application action for accessing a derived entity that matches a personal entity in the personal entity database for the user can be boosted for suggestion/recommendation.

Figure 9A:
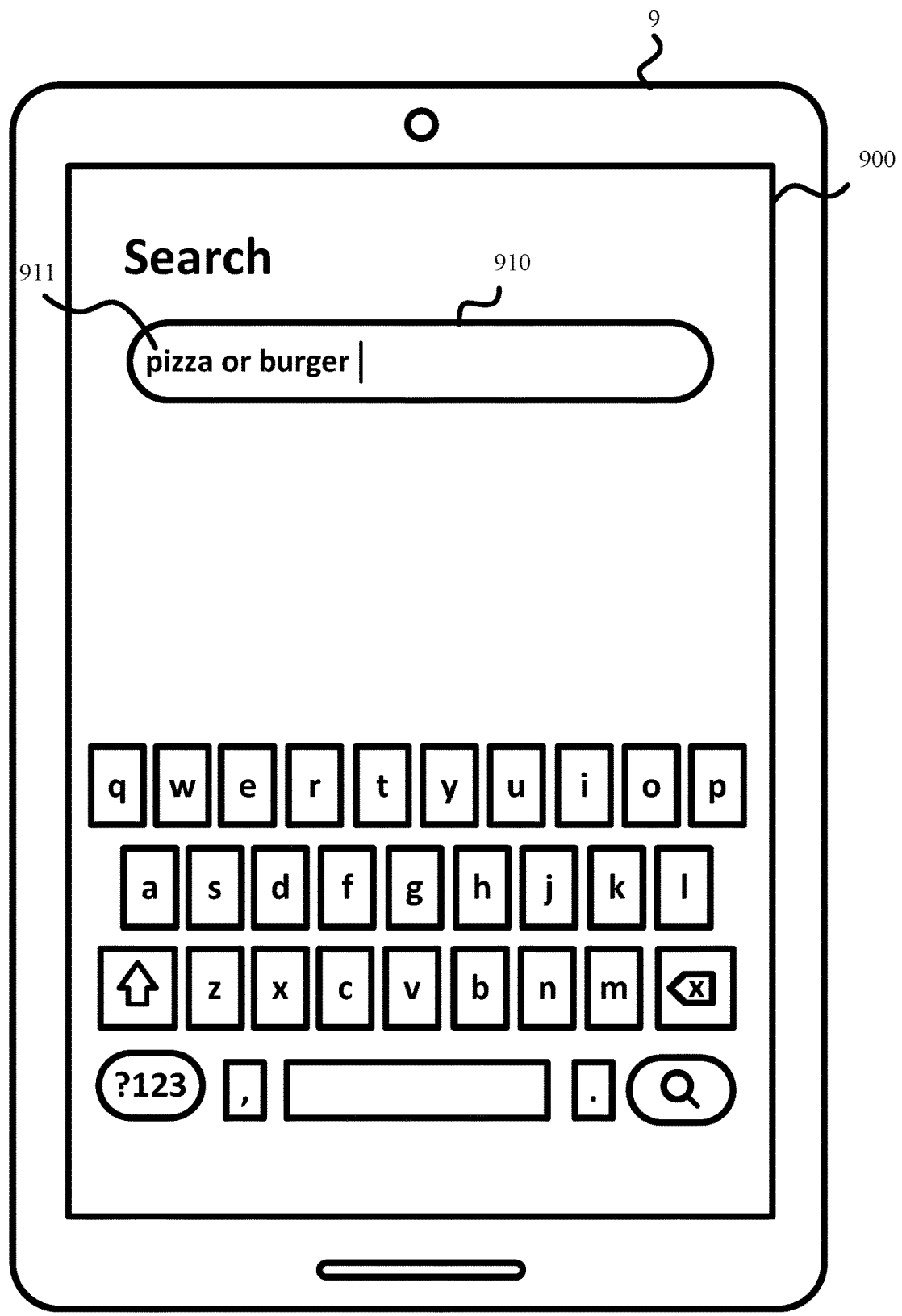
FIG. 9A depicts an example user interface showing a user query received via a search system that demonstrates various aspects of the present disclosure, and in which implementations disclosed herein may be implemented.
Figure 9B:
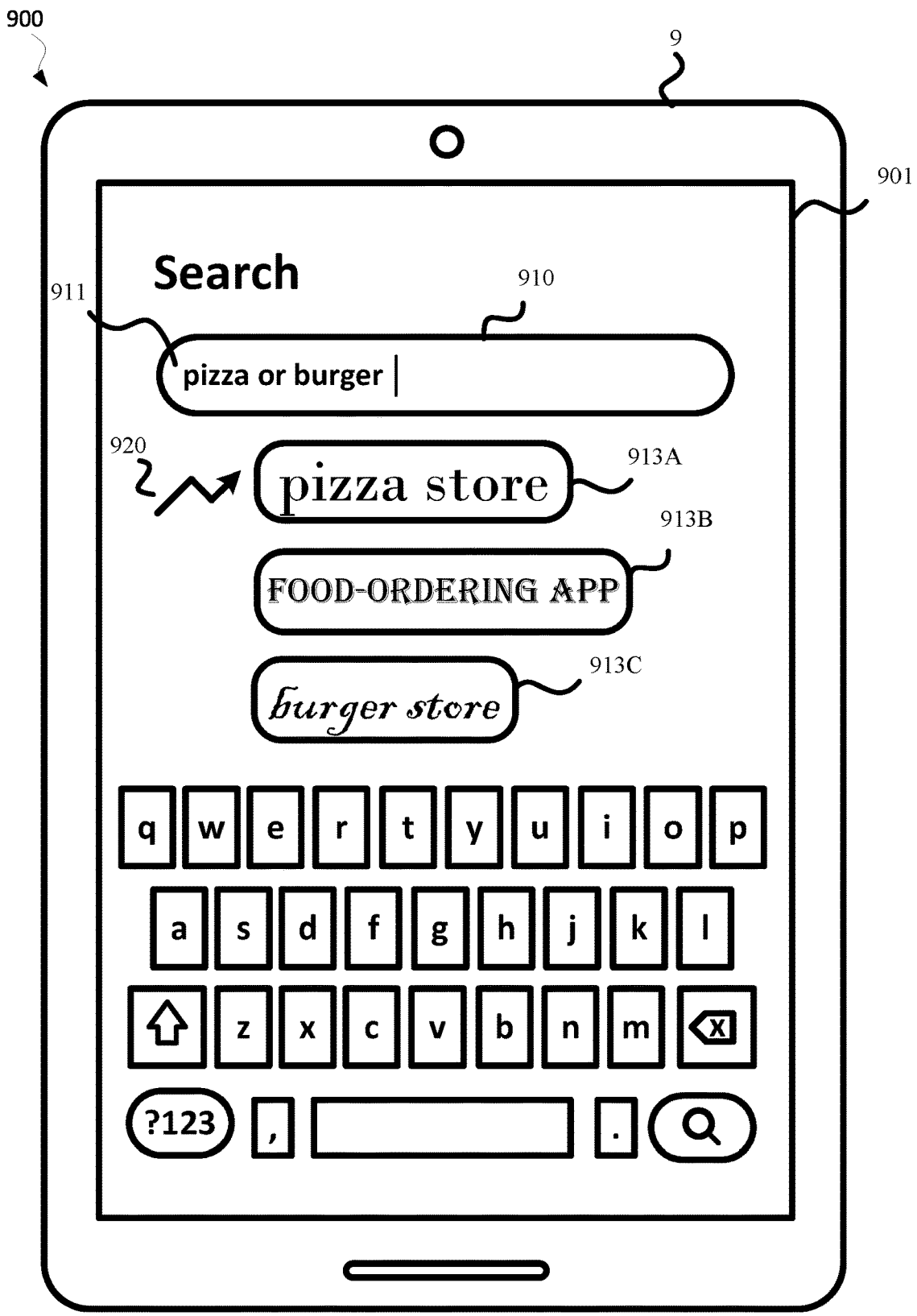
FIG. 9B depicts an example user interface showing suggestions responsive to the user query in FIG. 9A.

FIG. 9A depicts another non-limiting example user interface showing a user query/input received via a search system that demonstrates various aspects of the present disclosure, and in which implementations disclosed herein may be implemented. FIG. 9B depicts an example user interface showing suggestions responsive to the user query in FIG. 9A. As shown in FIG. 9A, a search field 910 of a user interface 900 of a client device 9 can receive a user query 911 of "pizza or burger". Referring to FIG. 9B, in response to receiving the user input 911 of "pizza or burger" in the search field 910, a plurality of suggestions (that suggest apps or app actions) can be generated, selected/filtered, and displayed within the user interface 900 in response to the user query 911 of "pizza or burger". The plurality of suggestions can include a first suggestion 913A (e.g., suggesting a first application of "pizza store" developed by a pizza store A from which a user of the user query 911 frequently orders pizza), a second suggestion 913B (e.g., suggesting a second application of "food-ordering app" to search for pizza stores and burger stores), and a third suggestion 913C (e.g., suggesting a third application of "burger store" developed by a burger store B which sells burgers). The first suggestion 913A can be rendered visually as a first selectable element that, when selected, causes a first application of "pizza store" to be launched or opened. The second suggestion 913B can be rendered visually as a second selectable element that, when selected, causes the second application of "food-ordering app" to be launched or opened. The third suggestion 913C can be rendered visually as a third selectable element that, when selected, causes the third application of "burger store" to be launched or opened.

For instance, the first selectable element 913A, when selected, can cause a user interface of the first application for "pizza store" to be rendered, where the user interface of the first application for "pizza store" includes a text field labeled "food" filled with "pizza or burger". Similarly, the second selectable element 913B, when selected, can cause a user interface of the second application of "navigation" to be rendered, where the user interface of the second application of "navigation" includes a text field of "food" filled with "pizza or burger". The third selectable element 913C, when selected, can cause a user interface of the third application of "burger store" to be rendered, where the user interface of the third application of "burger store" includes a text field of "food" filled with "pizza or burger".

In some implementations, instead of the first application suggestion 913A suggesting the first application of "pizza store", the second application suggestion 913B suggesting the second application of "food-ordering app", and the third application suggestion 913C suggesting the third application of "burger store", a first app action suggestion (not illustrated), a second app action suggestion (not illustrated), and a third app action suggestion (not illustrated) can be selected and rendered within the user interface 900 in response to the user query 911 (e.g., "pizza or burger"). The first app action suggestion can suggest a first app action of "order pizza at pizza store", the second app action suggestion can suggest a second app action of "search pizza and burger" within the "food-ordering app", and the third app action suggestion can suggest a third app action of "order burger at burger store".

The first app action suggestion can be embedded with a first link that, when the first app action suggestion is selected, causes the "pizza store" application to be opened in a state where a user interface of the pizza store application includes a food-searching field filled with "pizza" or "pizza or burger". The second app action suggestion can be embedded with a second link that, when the second app action suggestion is selected, causes the food-ordering app to be opened in a state where a user interface of the food-ordering app includes a search field filled with the word "pizza or burger". The third app action suggestion can be embedded with a third link that, when the third app action suggestion is selected, causes the third application of "burger store" to be opened in a state where a user interface of the "burger store" app includes a search field filled with the word "burger" (or "pizza or burger") and shows different burgers (and/or pizza) the burger store is able to offer.

The first link, second link, and third link can each be a URL link that includes parameter values (for one or more parameters) derived from entity information of the entity of "pizza" and/or the entity "burger".

In some implementations, the first application of "pizza store" suggested by the first suggestion 913A, the second application of "food-ordering app" suggested by the first suggestion 913B, and the third application of "burger store" suggested by the first suggestion 913C can be determined based on entity type of entities determined from the user query 911 of "pizza or burger". In some implementations, in response to receiving the user query of "pizza or burger" via a unified search interface (that allows searching of applications, content, and/or the Internet) of a client device (e.g., a cell phone), a named entity recognition (NER) engine can be applied to recognize a first (named) entity of "pizza" and a second (named) entity of "burger" from the user query of "pizza or burger". Additionally, the NER engine can label the first entity of "pizza" to have an entity type of "product", and label the second entity of "burger" to have an entity type of "product".

Based on the entity information (e.g., entity type of "product" for both the first and second entities, as well as an entity name of "pizza" for the first entity "pizza" and an entity name of "burger" for the second entity "burger") derived from the user query 911 of "pizza or burger", a plurality of applications (or application actions) can be determined. For instance, a first application of "pizza store", a second application of "food-ordering app", a third application of "burger store", and a fourth application of "map" can be determined based on the entity information. In some implementations, the fourth application of "map" can be filtered or removed from being suggested, based on, for instance, the map application hasn't been used to search any product within the past few months (or due to other reasons/ conditions).

In some implementations, a personal entity database storing personal entities can be queried/searched using the first entity of "pizza" and can also be queried/searched using the second entity of "burger". For instance, the personal entity database can store a first entry storing a first personal entity of "my favorite pizza" (in association with "pizza store") donated by the first application of "pizza store" (where "my favorite pizza" corresponds to "Hawaii pizza" from this particular "pizza store"), a second entry storing a second personal entity of "my favorite food" (in association with "food-ordering app") donated by the second application of "food-ordering app" (where "my favorite food" corresponds to "Galbitang" labeled as favorite food or most frequently ordered food in the "food-ordering app" by a user that provides the input of "pizza or burger"), and/or one or more additional entities. In this instance, the personal entity database may not store any entry related to "burger", and accordingly, the query of such entity database can result in the first application of "pizza store" being marked and boosted (using for instance, an animation or symbol 920 in FIG. 9B) for suggestion, but the second application of "food-ordering app" and the third application of "burger" will not be boosted for suggestion. In this case, the first suggestion 913A can include a name for the "pizza store" and/or an image of the "Hawaii pizza" (which is "my favorite pizza") from this particular "pizza store", and/or other information (e.g., the number of times ordering the "Hawaii pizza" from the "pizza store"). The image of the "Hawaii pizza" and/or other information, for instance, can be retrieved from metadata associated with the first personal entity of "my favorite pizza" in the personal entity database.

Figure 10:
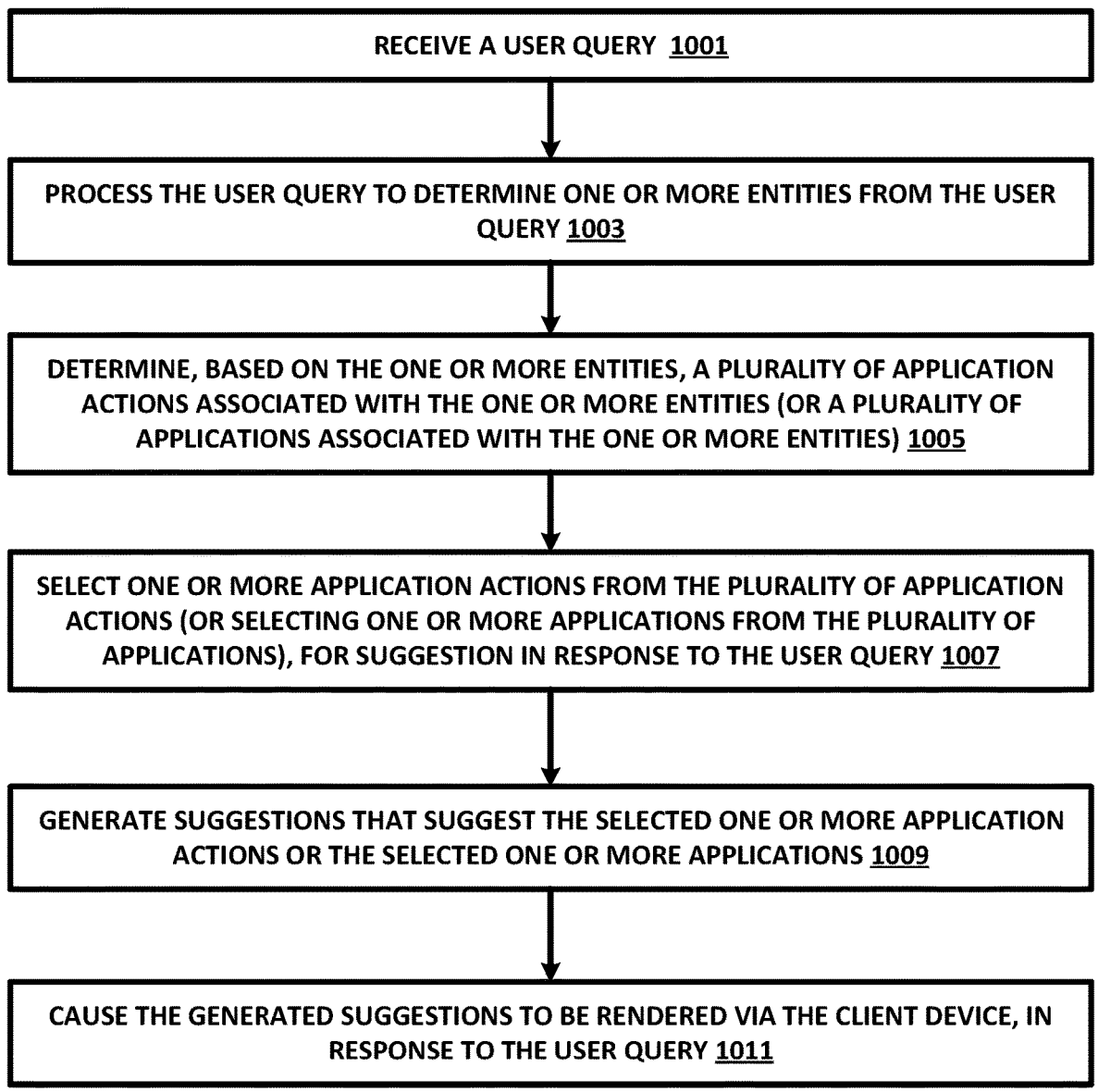
FIG. 10 illustrates an example method for generating suggestions responsive to a user query, in accordance with various implementations.

FIG. 10 illustrates an example method for generating suggestions responsive to a user query, in accordance with various implementations. For convenience, the operations of the method 1000 are described with reference to a system that performs the operations. The system of method 1000 includes one or more processors and/or other component(s) of a client device and/or of a server device. Moreover, while operations of the method 1000 are shown in a particular order, this is not meant to be limiting. One or more operations may be reordered, omitted, or added.

Referring to FIG. 10, in various implementations, at block 1001, the system can receive a user query. The user query can be received via a client device, for instance, via a unified user interface of the client device. The user query can be, for instance, a typed user input received via a search field of the unified user interface displayed at the client device. The user query can alternatively be an audible user input. The search field of the unified user interface can receive user input to search for applications, content stored at the client device, and/or the Internet.

In various implementations, at block 1003, the system can process the user query to determine one or more entities from the user query. As a non-limiting example, given a user query of "airport in Louisville", a first entity of "airport" can be determined, and a second entity of "Louisville" can be determined. In this example, a NER engine can be applied to process the user query and extract the first and second entities from the user query. The NER engine can further label the first entity and the second entity based on types or categories of the first and second entities. For instance, the first entity "airport" can be labeled as a "facility" entity and the second entity "Louisville" can be labeled as a "geopolitical" entity (or location entity).

In various implementations, at block 1005, the system can determine a plurality of applications (or a plurality of application actions) associated with the one or more entities. In some implementations, the plurality of applications (or the plurality of application actions) can be determined using the entity pivoting engine (e.g., 711 in FIG. 7). In some implementations, entity information of the one or more entities can be determined/retrieved, where the entity information includes types of the one or more entities. Continuing with the non-limiting example above, the system can retrieve the entity information of the first entity "airport" and the entity information of the second entity "Louisville". The entity information of the first entity "airport" can include an entity type (e.g., facility type) of the first entity "airport", and the entity information of the second entity "Louisville" can include an entity type (e.g., location type) of the second entity "Louisville".

In some implementations, the system determines, based on the determined entity information, a plurality of application actions associated with the one or more entities (or a plurality of applications associated with the one or more entities). Continuing with the non-limiting example above, the system can determine that a first application "traveling app", a second application "navigation app", and a third application developed by a specific airline, are associated with the first entity "airport" and the second entity "Louisville". Or, the system can determine that a first application action of "book a flight to Louisville airport" (performable via the first application), a second application action of "navigate to Louisville airport" (performable via the second application), and a third application action of "book a flight to Louisville airport" (performable via the third application), for the first entity "airport" and the second entity "Louisville".

In some implementations, application ranking scores can be determined and retrieved for the plurality of application actions associated with the one or more entities. Or in case the plurality of application actions associated with the one or more entities are determined (instead of the plurality of applications associated with the one or more entities are determined), application action ranking scores can be determined and retrieved for the plurality of application actions associated with the one or more entities.

In various implementations, at block 1007, the system can select one or more application actions from the plurality of application actions (or selecting one or more applications from the plurality of applications), for suggestion in response to the user query. Continuing with the non-limiting example above, the system can remove the third application (or the third application action) from being suggested based on the third application being developed by a specific airline that does not provide service for any airport in Louisville. In this non-limiting example, the system can further rank the remaining applications (i.e., the first application "traveling app", and the second application "navigation app").

In some implementations, selecting the application from the plurality of applications is based at least on the application ranking scores. Or, in case the plurality of application actions associated with the one or more entities are determined (instead of the plurality of applications associated with the one or more entities are determined), selecting the application action from the plurality of application actions is based at least on the application action ranking scores.

In various implementations, at block 1009, the system can generate suggestions that suggest the selected one or more application actions or the selected one or more applications. Continuing with the non-limiting example above, the system can generate a first suggestion suggesting the first application "traveling app", and generate a second suggestion suggesting the second application "navigation app". The first suggestion can be a first selectable element which, when selected, causes the first application to be launched (e.g., in a state where a destination field is filled with "Louisville airport"). The second suggestion can be a second selectable element which, when selected, causes the second application to be launched (e.g., in a state where a destination field is filled with "Louisville airport").

In various implementations, at block 1011, the system can cause the generated suggestions to be rendered via the client device, in response to the user query. Continuing with the non-limiting example above, the system can cause the first suggestion and the second suggestion to be visually rendered in response to the user query.

Figure 11:
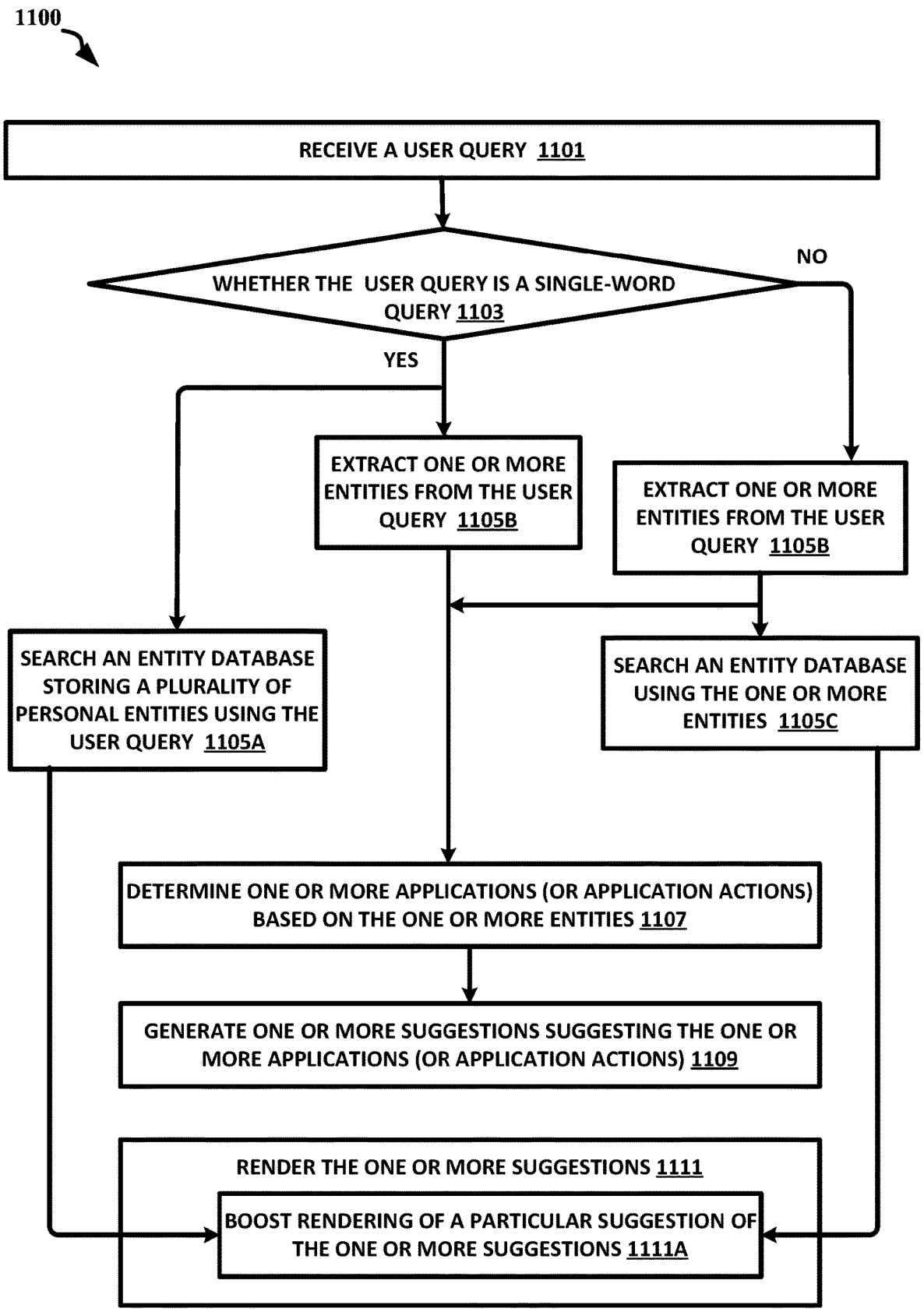
FIG. 11 illustrates an example method for generating suggestions responsive to a user query, in accordance with various implementations.

FIG. 11 illustrates an example method for generating suggestions responsive to a user query, in accordance with various implementations. For convenience, the operations of the method 1100 are described with reference to a system that performs the operations. The system of method 1100 includes one or more processors and/or other component(s) of a client device and/or of a server device. Moreover, while operations of the method 1100 are shown in a particular order, this is not meant to be limiting. One or more operations may be reordered, omitted, or added.

In various implementations, at block 1101, the system can receive, via a client device, a user query. In various implementations, at block 1103, the system can determine whether the user query is a single-word query that contains a single word. In response to determining that the user query is a single-word query, the system can search an entity database that stores a plurality of personal entities using the user query (block 1105A) and extract one or more entities from the user query (block 1105B). In some implementations, the system can search an entity database that stores a plurality of personal entities using the user query (block 1105A), in parallel to extracting one or more entities from the user query (block 1105B). However, the system does not need to search an entity database that stores a plurality of personal entities using the user query (block 1105A), in parallel to extracting one or more entities from the user query (block 1105B). For instance, the system can search an entity database that stores a plurality of personal entities using the user query (block 1105A), prior to or subsequent to, extracting one or more entities from the user query (block 1105B). The search described herein is to determine whether any personal entity stored in the entity database matches the named entity derived from the user query. For example, the user query can be a single word of "pizza", and the search of the entity database can indicate that a personal entity of "Store A pizza" (which is stored in the entity database) matches the single-word query of "pizza". In this case, an application for "store A" that sells "store A pizza" can be subsequently marked/labeled for a boosted suggestion to a user of the client device that provides the single-word query.

In response to determining that the user query is not a single-word query (i.e., include more than one word), the system can extract one or more entities from the user query (block 1105B) and search the entity database that stores the plurality of personal entities using the one or more entities (block 1105C).

In some implementations, the system can process the user query using the named entity recognition (NER) engine as described above, to recognize/extract the one or more entities (e.g., a first entity of "SF" and a second entity of "SFO" for a user query of "SF", or an entity of "park" labeled as location and an additional entity of "park" labeled as last name for a user query of "park", etc.).

In various implementations, at block 1107, the system can determine one or more applications (and/or application actions) that correspond to the one or more entities. In various implementations, at block 1109, the system can generate one or more suggestions based on the one or more applications (and/or application actions) that are determined to correspond to the one or more entities.

In various implementations, at block 1111, the system can cause the one or more generated suggestions to be rendered to the user of the client device, the one or more generated suggestions include a particular suggestion that is boosted for rendering based on the particular suggestion is generated based on a particular entity from the one or more entities that matches a personal entity in the personal entity database (block 1111A).

Implementations of the disclosure are not limited to descriptions above. For example, in various implementations, a computer-implemented method is provided, and the method includes: receiving, based on user interface input of a user via a client device, a user query that fails to explicitly identify any application; processing the user query to determine one or more entities from the user query; determining a plurality of applications that are associated with the one or more entities; generating one or more suggestions that suggest one or more applications from the plurality of applications; causing the one or more suggestions that suggest the one or more applications to be rendered in response to the user query. In some implementations, causing the one or more suggestions to be rendered includes: causing a particular suggestion, from the one or more suggestions, to be rendered in a boosted manner, where the particular suggestion suggests a particular application to access an entity that is from the one or more entities and that corresponds to a personal entity. The personal entity can be specific to the user.

In some implementations, the personal entity can contain or can indicate personal information (e.g., personal identifiable information, personal preference information, etc.) of the user. As a non-limiting example, the personal entity can be a credit or debit card ending with 5555 that is accessible via a digital wallet application installed at, or otherwise accessible via, the client device. In this example, the personal entity of the credit or debit card ending with 5555 and/or associated historical data (e.g., one or more actions historically performed via the digital wallet application with respect to the personal entity, fulfillment data associated with the one or more actions such as "access" or "pay", etc.) can be donated by the digital wallet application to a personal entity database. In response to receiving the personal entity and/or the historical data associated with the personal entity, an entry can be created in the personal entity database. The entry can be created for the personal entity (e.g., the credit or debit card ending with 5555) and can include metadata associated with the personal entity, where the metadata includes, for instance, a donor application (e.g., the digital wallet application) that donates the personal entity, fulfillment data for performing one or more actions with respect to the personal entity via the donor application (e.g., the digital wallet) that donates the personal entity, last access (or a plurality of historical accesses) to the donor application (and/or the personal entity) with corresponding timestamp(s), and/or other information determined from the historical data associated with the personal entity. Put another way, in some implementations, the personal entity can be previously accessed by the user via the client device, or can be donated by an application that is installed at (or otherwise accessible via) the client device. In some implementations, causing the particular suggestion to be rendered in the boosted manner is in response to the particular suggestion corresponding to the personal entity.

In some implementations of the various implementations, the plurality of applications that are determined as being associated with the one or more entities are installed at or otherwise accessible via the client device.

In some of the various implementations, the particular suggestion can be rendered in a boosted manner by being rendered more prominently than the other suggestion(s). For instance, the particular suggestion can be rendered more prominently by being rendered above all other suggestion(s), being rendered in a larger font than all other suggestion(s), being rendered in a bolded font (whereas other of the suggestion(s) are not), and/or being rendered with a visual indicator indicating that the particular suggestion is a boosted suggestion, etc.

In some of the various implementations, determining the plurality of applications that are associated with the one or more entities includes: determining entity information of the one or more entities, and determining, based on the entity information of the one or more entities, the plurality of applications that are associated with the one or more entities. In some of these implementations, the entity information includes an entity type for each of the one or more entities.

In some of the various implementations, processing the user query to determine one or more entities from the user query includes: processing the user query to determine the one or more entities and a corresponding recognition score for each of the one or more entities. In some of these implementations, the plurality of applications are ranked based at least on the corresponding recognition scores for the one or more entities.

In some of the various implementations, the method further includes: searching, based on the user query, a personal entity database storing a plurality of personal entities, where the entity is determined to correspond to the personal entity based on searching the personal entity database resulting in identifying the personal entity based on the user query. In some of these implementations, the user query includes a single word, and searching the personal entity database includes: searching the personal entity database using the single word, to identify the entity that corresponds to the personal entity. In some other implementations of these implementations, the user query includes multiple words, and searching the personal entity database includes: searching the personal entity database using the one or more entities, respectively, to identify the entity that corresponds to the personal entity.

In some of the various implementations, generating the one or more suggestions that suggest the one or more applications from the plurality of applications includes: selecting the one or more applications from the plurality of applications based on one or more factors, and generating the one or more suggestions that suggest the selected one or more applications. In some of these implementations, the one or more factors include availability of each of the plurality of applications, last access or modification for each of the plurality of applications, or any other applicable factor as described elsewhere of the disclosure.

In various implementations, a computer-implemented method is provided and includes: receiving, based on user interface input of a user via a client device, a user query that fails to explicitly identify any application; processing the user query to determine one or more entities from the user query; determining a plurality of application actions that are associated with the one or more entities; generating one or more suggestions that suggest one or more application actions from the plurality of application actions; and causing the one or more suggestions that suggest the one or more application actions to be rendered in response to the user query. Causing the one or more suggestions to be rendered can include: causing a particular suggestion, from the one or more suggestions, to be rendered in a boosted manner, where the particular suggestion suggests a particular application action in association with an entity that is from the one or more entities and that corresponds to a personal entity. The personal entity is previously accessed by the user via the client device and/or is donated by a particular application (installed at or accessible via the client device) via which the particular application action was previously performed. Causing the particular suggestion to be rendered in the boosted manner can be in response to the particular suggestion corresponding to the personal entity.

In some of the various implementations, determining the plurality of application actions that are associated with the one or more entities includes: determining entity information of the one or more entities, and determining, based on the entity information of the one or more entities, the plurality of application actions that are associated with the one or more entities. The entity information, for instance, includes an entity type for each of the one or more entities.

In some of the various implementations, processing the user query to determine one or more entities from the user query includes: processing the user query to determine the one or more entities and a recognition score for each of the one or more entities. The plurality of applications can be ranked based at least on the recognition score for each of the one or more entities.

In some of the various implementations, the method further includes: searching, based on the user query, a personal entity database storing a plurality of personal entities, where the entity is determined to correspond to the personal entity based on searching the personal entity database.

In some of the various implementations, the user query includes a single word, and searching the personal entity database includes: searching the personal entity database using the single word.

In some of the various implementations, the user query includes multiple word, and searching the personal entity database includes: searching the personal entity database using each of the one or more entities.

In some of the various implementations, the particular suggestion suggesting the particular application action in association with the entity includes an embedded link that, when executed, causes the particular application action to be performed.

In various implementations, a further computer-implemented method is provided and includes: receiving, via a client device and from a user, user input; processing the user input to determine one or more entities from the user input; determining a plurality of applications that are associated with the one or more entities; generating one or more suggestions that suggest one or more applications from the plurality of applications; causing the one or more suggestions that suggest the one or more applications to be rendered in response to the user input; receiving additional user input that modifies a last word of the user input; and causing one or more additional suggestions that suggest the one or more additional applications to be rendered in response to receiving the additional user input, where a particular suggestion, from the one or more suggestions or from the one or more additional suggestions, is rendered in a boosted manner in response to the particular suggestion suggesting a particular application to access an entity, from the one or more entities, that corresponds to a personal entity previously accessed by the user via the client device or donated by the particular application (installed at or accessible via the client device).

What is claimed is:

1. A computer-implemented method, comprising:
    receiving, based on user interface input of a user via a client device, a user query that fails to explicitly identify any application;
    processing the user query to determine one or more entities from the user query;
    determining a plurality of applications that are installed at the client device and that are associated with the one or more entities;
    generating one or more suggestions that suggest one or more applications from the plurality of applications;
    causing the one or more suggestions that suggest the one or more applications to be rendered in response to the user query, wherein causing the one or more suggestions to be rendered comprises:
        causing a particular suggestion, from the one or more suggestions, to be rendered in a boosted manner, the particular suggestion suggesting a particular application to access an entity, from the one or more entities, that corresponds to a personal entity that is previously accessed by the user via the client device or that is donated by the particular application accessible via the client device,
        wherein causing the particular suggestion to be rendered in the boosted manner is in response to:
            determining that the particular suggestion suggests the particular application to access the entity, and
            determining, using an on-device repository of the client device, that the entity corresponds to the personal entity previously accessed by the user via the client device or donated by the particular application,
        wherein the particular suggestion identifies the particular application and the personal entity, and
        wherein a user selection of the particular suggestion, when rendered, causes the particular application to be launched and transitioned to a state in which the entity is surfaced.

2. The method of claim 1, wherein determining the plurality of applications that are associated with the one or more entities comprises:
    determining entity information of the one or more entities, and
    determining, based on the entity information of the one or more entities, the plurality of applications that are associated with the one or more entities.

3. The method of claim 2, wherein the entity information includes an entity type for each of the one or more entities.

4. The method of claim 1, wherein processing the user query to determine one or more entities from the user query comprises:
    processing the user query to determine the one or more entities and a corresponding recognition score for each of the one or more entities.

5. The method of claim 4, wherein the plurality of applications are ranked based at least on the corresponding recognition scores for the one or more entities.

6. The method of claim 1, further comprising:
    searching, based on the user query, a personal entity database storing a plurality of personal entities, wherein the entity is determined to correspond to the personal entity based on searching the personal entity database resulting in identifying the personal entity based on the user query.

7. The method of claim 6, wherein the user query includes a single word, and searching the personal entity database comprises:
    searching the personal entity database using the single word, to identify the entity that corresponds to the personal entity.

8. The method of claim 6, wherein the user query includes multiple words, and searching the personal entity database comprises:
    searching the personal entity database using the one or more entities, respectively, to identify the entity that corresponds to the personal entity.

9. The method of claim 1, wherein generating the one or more suggestions that suggest the one or more applications from the plurality of applications comprises:
    selecting the one or more applications from the plurality of applications based on one or more factors, and
    generating the one or more suggestions that suggest the selected one or more applications.

10. The method of claim 9, wherein the one or more factors include availability of each of the plurality of applications.

11. A client device, comprising:
    memory storing instructions;
    one or more processors operable to execute the instructions to:
        receive, based on user interface input of a user via the client device, a user query that fails to explicitly identify any application;
        process the user query to determine one or more entities from the user query;
        determine a plurality of applications that are installed at the client device and that are associated with the one or more entities;
        generate one or more suggestions that suggest one or more applications from the plurality of applications;
        cause the one or more suggestions that suggest the one or more applications to be rendered in response to the user query, wherein in causing the one or more suggestions to be rendered one or more of the processors are to:
            cause a particular suggestion, from the one or more suggestions, to be rendered in a boosted manner, the particular suggestion suggesting a particular application to access an entity, from the one or more entities, that corresponds to a personal entity that is previously accessed by the user via the client device or that is donated by the particular application accessible via the client device, wherein causing the particular suggestion to be rendered in the boosted manner is in response to:
  determining that the particular suggestion suggests the particular application to access the entity, and
  determining, using an on-device repository of the client device, that the entity corresponds to the personal entity previously accessed by the user via the client device or donated by the particular application,
wherein the particular suggestion identifies the particular application and the personal entity, and
wherein a user selection of the particular suggestion, when rendered, causes the particular application to be launched and transitioned to a state in which the entity is surfaced.

* * * * *